(12) United States Patent
Honda et al.

(10) Patent No.: US 8,684,399 B2
(45) Date of Patent: Apr. 1, 2014

(54) GAS GENERATOR AND AIRBAG APPARATUS

(71) Applicant: Toyoda Gosei Co., Ltd., Kiyosu (JP)

(72) Inventors: Kensaku Honda, Kiyosu (JP); Yuji Sato, Kiyosu (JP); Takashi Iida, Kiyosu (JP); Yoshiaki Goto, Kiyosu (JP); Masashi Hotta, Kiyosu (JP); Eiji Sato, Kiyosu (JP); Akira Yamashita, Kiyosu (JP); Yoshihiko Hishiki, Kiyosu (JP); Yoshinari Takei, Kiyosu (JP); Kikuyo Izoe, Kiyosu (JP); Naoki Nimi, Kiyosu (JP); Toshihiro Hosoi, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/924,720

(22) Filed: Jun. 24, 2013

(65) Prior Publication Data
US 2013/0341892 A1 Dec. 26, 2013

(30) Foreign Application Priority Data

Jun. 26, 2012 (JP) ................. 2012-143276
Sep. 14, 2012 (JP) ................. 2012-202452
Dec. 19, 2012 (JP) ................. 2012-276992

(51) Int. Cl.
*B60R 21/16* (2006.01)
(52) U.S. Cl.
USPC .................................... 280/728.2
(58) Field of Classification Search
USPC ............................ 280/728.2, 741
See application file for complete search history.

(56) References Cited

U.S. PATENT DOCUMENTS

| 6,231,069 | B1 | 5/2001 | Yokoyama |
| 6,976,700 | B2 * | 12/2005 | McCann et al. ............ 280/728.2 |
| 7,699,340 | B2 * | 4/2010 | Okuhara et al. ............ 280/728.2 |
| 2003/0141705 | A1 | 7/2003 | Oka et al. |
| 2007/0284859 | A1 | 12/2007 | Kashiwagi |
| 2007/0284862 | A1 | 12/2007 | Kashiwagi |

FOREIGN PATENT DOCUMENTS

| JP | 11-157409 A | 6/1999 |
| JP | 11-189115 A | 7/1999 |
| JP | 2001-301558 A | 10/2001 |
| JP | 2003-220924 A | 8/2003 |
| JP | 2007-331401 A | 12/2007 |
| JP | 2008-018925 A | 1/2008 |
| JP | 2011-121469 A | 6/2011 |

* cited by examiner

*Primary Examiner* — Faye M. Fleming
(74) *Attorney, Agent, or Firm* — Posz Law Group, PLC

(57) ABSTRACT

A gas generator includes an inflator and a retainer. The retainer includes a holding portion, which partially covers the inflator. The inflator has an attaching protrusion for determining the position relative to the retainer. The retainer includes an engagement base and a tongue piece. The tongue piece extends in an axial direction of the inflator and from a position separated from the engagement base in the circumferential direction of the holding portion. The engagement base and the tongue piece each have an engagement portion. The engagement portions face each other to form an engagement space therebetween, into which the attaching protrusion enters. The engagement space has an inlet the width of which is less than the size of the positioning protrusion. When the inflator causes the positioning protrusion to increase the width of the inlet, the tongue piece is elastically deformed about a basal end of the tongue piece.

14 Claims, 10 Drawing Sheets

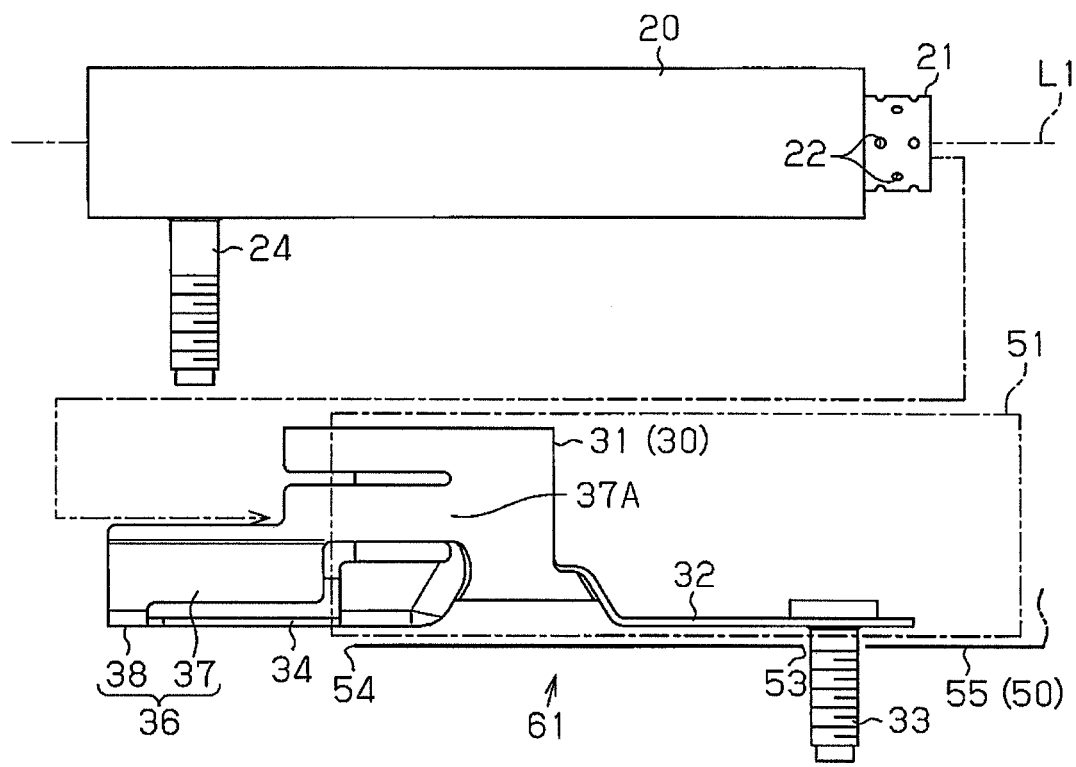
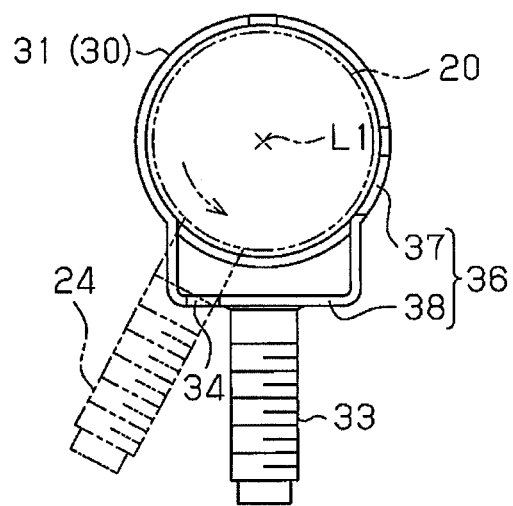

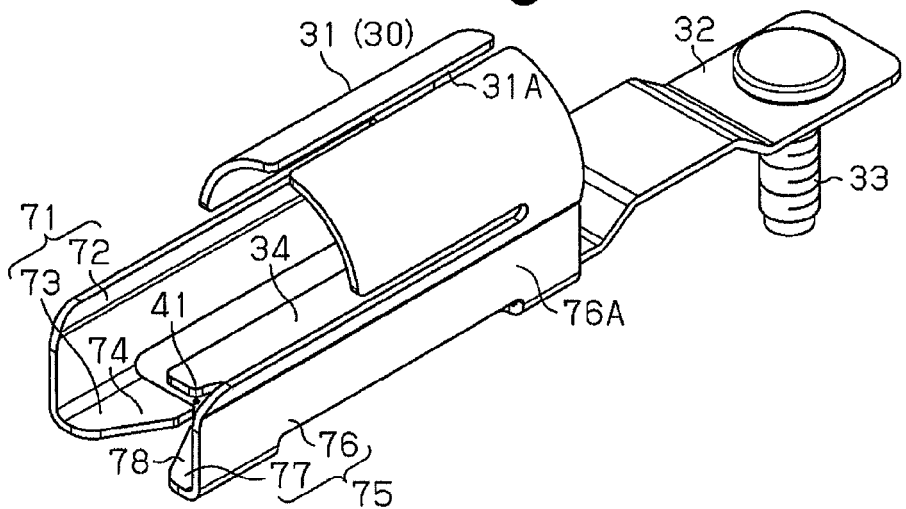
Fig.18
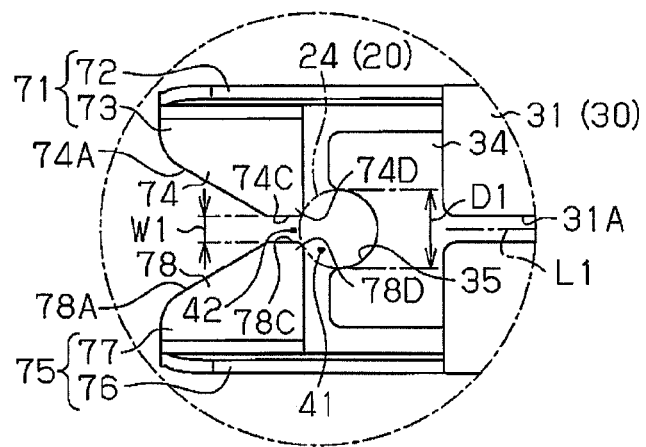
Fig.19
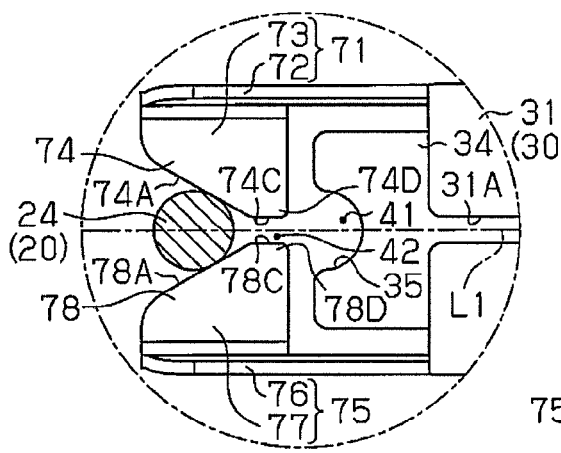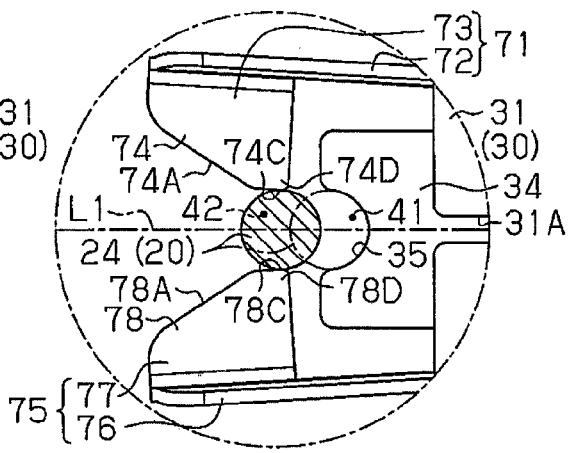
Fig.20A   Fig.20B

GAS GENERATOR AND AIRBAG APPARATUS

BACKGROUND OF THE INVENTION

The present invention relates to a device for generating gas and an airbag apparatus for protecting an occupant from an impact by inflating an airbag with gas generated by the gas generator.

An airbag apparatus protects an occupant from an impact when an impact due to, for example, a collision is applied to a vehicle. The airbag apparatus causes a gas generator to generate gas in response to an impact, and uses the gas to inflate an airbag in the vicinity of the occupant to reduce the impact applied to the occupant.

Known gas generators include a columnar inflator for generating gas and a retainer that covers the inflator and fastens the inflator to a component of a vehicle.

For example, Japanese Laid-Open Patent Publication No. 2011-121469 discloses an airbag apparatus that includes an inflator having bolts on the outer surface. The bolts are separated from each other in the axial direction of the inflator. The bolts protrude in a direction perpendicular to the axis of the inflator.

A retainer (referred to as a sleeve in Japanese Laid-Open Patent Publication No. 2011-121469) has a tubular holding portion, which covers one end of the inflator in the axial direction. A tongue piece having a passage hole extends from the holding portion in the axial direction of the inflator. The passage hole is formed by a longitudinal section extending in the axial direction of the inflator and a short transverse section extending from an end of the longitudinal section in the circumferential direction of the holding portion.

When the inflator is assembled to the retainer of the gas generator, a bolt is passed through an end of the longitudinal section that is on the opposite side to the short transverse section. Then, the inflator is moved in its axial direction to insert an end of the inflator into the holding portion, thereby sliding the bolt toward the short transverse section along the longitudinal section. When the bolt is slid to the boundary between the longitudinal section and the short transverse section, the inflator is rotated about its axis. The rotation causes the bolt to pivot about the axis of the inflator. When the bolt is moved along the short transverse section in the circumferential direction of the holding portion and separated from the boundary between the short transverse section and the longitudinal section, the inflator is restricted from moving in its axial direction relative to the retainer. Accordingly, the position of the inflator is determined in the axial direction.

SUMMARY OF THE INVENTION

To assemble the inflator to the retainer in the gas generator, Japanese Laid-Open Patent Publication No. 2011-121469 requires a step for passing the bolt through the longitudinal section of the passage hole, a step for causing the bolt to slide along the longitudinal section, and a step for moving the bolt along the short transverse section in the circumferential direction of the holding part. These steps complicate the assembling operation.

Also, since the bolt must be moved along the short transverse section in the circumferential direction of the holding portion, the short transverse section is required to have a width greater than the size (the outer diameter) of the bolt. When the bolt has been moved in the circumferential direction of the holding portion and away from the boundary between the short transverse section and the longitudinal section, there is a clearance between the bolt and the inner wall of the short transverse section. Therefore, the inflator may rattle relative to the retainer in the axial direction or in the circumferential direction of the holding portion.

Likewise, the airbag apparatus having the gas generator may rattle.

Accordingly, it is an objective of the present invention to provide a gas generator and an airbag apparatus that facilitate assembly of an inflator to a retainer and reduce rattling of the assembled inflator.

To achieve the foregoing objective, and in accordance with one aspect of the present invention, a gas generator having an elongated inflator which discharges gas for inflation and a retainer having a holding portion is provided. The holding portion covers part of the inflator with respect to a direction of an axis of the inflator. A positioning protrusion for determining the position of the inflator relative to the retainer is formed on an outer surface of the inflator. The retainer includes an engagement base and a tongue piece. The tongue piece extends in the direction of the axis of the inflator and from a position separated from the engagement base in the circumferential direction of the holding portion. The engagement base has an engagement portion. The tongue piece has an engagement portion located at a position separated from a basal end of the tongue piece. The engagement portion of the engagement base and the engagement portion of the tongue piece face each other such that an engagement space is formed between the engagement portions, into which space the positioning protrusion enters. The engagement space has an inlet the width of which is less than a size of the positioning protrusion. In a state in which part of the inflator is covered with the holding portion, when the inflator is rotated or moved to cause the positioning protrusion of the inflator to increase the width of the inlet, the tongue piece is elastically deformed about a fulcrum, which is the basal end of the tongue piece, to increase the width of the inlet.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a side view illustrating a state before the inflator is installed to the retainer in the first embodiment;

FIG. 9 is a front view illustrating a transitional state in which the inflator (shown by broken lines in which a long dash alternates with a pair of short dashes) is being assembled to the retainer in the first embodiment;

FIG. 18 is a perspective view illustrating a retainer to be installed in a gas generator according to a third embodiment;

FIG. 19 is a partial plan view showing part of the retainer of the third embodiment;

FIGS. 20A and 20B are partial plan views corresponding to FIG. 19, illustrating a process in which an attaching protrusion of the inflator is engaged with an engagement portion of the retainer in the third embodiment;

DETAILED DESCRIPTION OF THE PREFERRED EMBODIMENTS

First Embodiment

A gas generator 10 and an airbag apparatus 60 according to a first embodiment will now be described with reference to FIGS. 1 to 13.

The airbag apparatus 60 is installed in a vehicle. The gas generator 10 forms part of the airbag apparatus.

Figure 11:
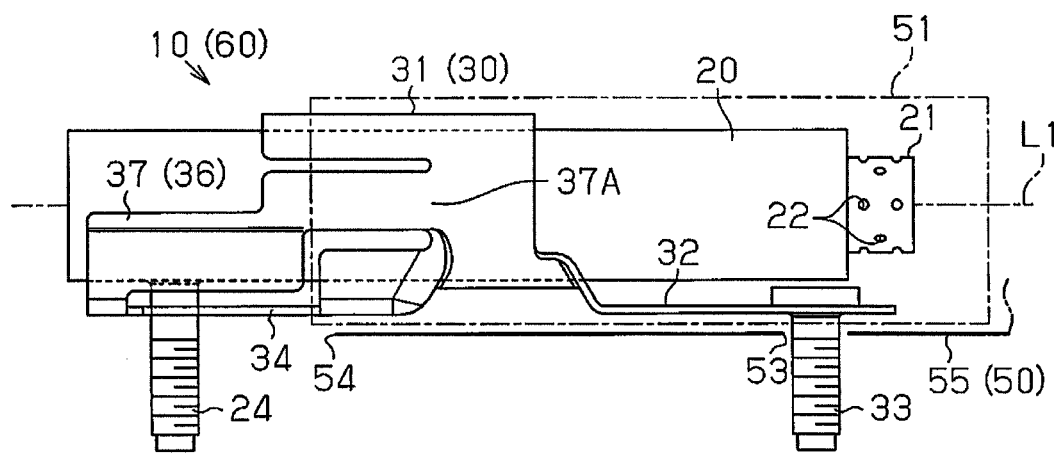
FIG. 11 is a partial cross-sectional side view illustrating a state in which the inflator is attached to the transitional assembly of the airbag apparatus in the first embodiment.
Figure 12:
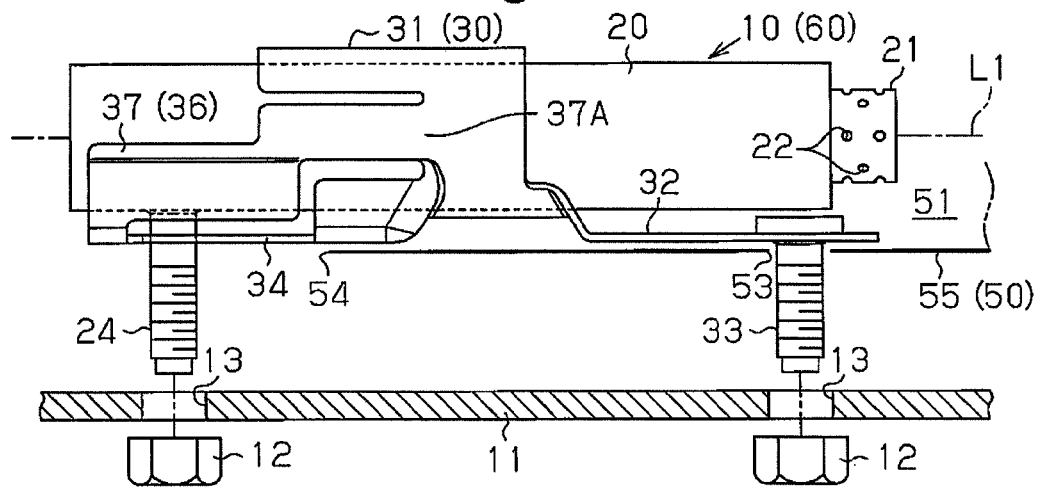
FIG. 12 is a partial cross-sectional side view illustrating the airbag apparatus before being fixed in a vehicle in the first embodiment.

FIG. 11 illustrates the airbag apparatus 60 having the gas generator 10. When an impact is applied to the vehicle due to, for example, a collision, the airbag apparatus 60 shown in FIG. 11 causes the gas generator 10 to generate inflation gas to deploy and inflate an airbag 50 at a position in the vicinity of an occupant seated in a vehicle seat, thereby protecting the occupant from the impact.

The gas generator 10 includes a retainer 30, which is secured to the airbag 50, and an inflator 20, which is assembled with the retainer 30 and discharges inflation gas.

Components of gas generator 10 will now be described.

<Inflator 20>

As shown in FIGS. 8 and 9, the inflator 20 has an elongated columnar shape and accommodates in it a gas generating agent (not shown), which generates inflation gas. The inflator 20 has a gas outlet 21 in a part in the direction of the axis L1, which is a first end (the right end in FIG. 8) in the present embodiment. The gas outlet 21 has a diameter smaller than the remainder of the inflator 20. Gas ports 22 are formed on the outer circumferential surface of the gas outlet 21. A harness (not shown), which is wiring for supplying activation signals to the inflator 20, is connected to a second end (the left end in FIG. 8) in the direction of the axis L1 of the inflator 20.

The inflator 20, which uses a gas generating agent, is of the pyrotechnic type. In place of the pyrotechnic type inflator, it is possible to use a hybrid type inflator, which discharges inflation gas by breaking, with a low explosive, a partition wall of a high-pressure gas cylinder filled with high-pressure gas.

The inflator 20 has an attaching protrusion 24 formed on the outer surface. The attaching protrusion 24 is located in the vicinity of a second end (the left end as viewed in FIG. 8) that is separated from the gas outlet 21. Together with the inflator 20 and the retainer 30, the attaching protrusion 24 is fixed to a vehicle component 11 (for example, the frame of a seat shown in FIG. 12) through fastening. The attaching protrusion 24 is formed by a bolt that protrudes from the outer surface of the inflator 20 in a direction intersecting the axis L1, which is a direction perpendicular to the axis L1 in the present embodiment. The bolt extends radially outward (downward as viewed in FIG. 8).

In the first embodiment, the attaching protrusion 24 also functions to determine the position of the inflator 20 relative to the retainer 30. The attaching protrusion 24 of the inflator 20 has a circular cross section and an external thread like a shaft of a typical bolt.

<Retainer 30>

Operation of the retainer 30 will now be described.

When the retainer 30 is fastened to the vehicle component 11, the retainer 30 fastens the inflator 20 and the airbag 50 to the vehicle component 11.

Figure 7A:
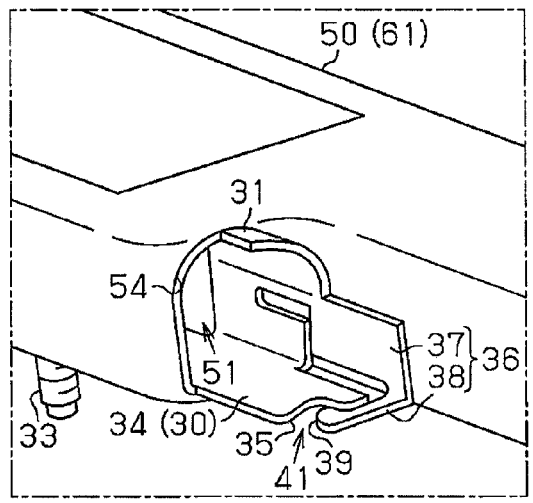
FIGS. 7A to 7D are perspective views illustrating a procedure for attaching an inflator to a transitional assembly during installation of an airbag apparatus of the first embodiment.

The airbag 50 is folded into a compact transitional form for distribution (specifically, a transitional assembly 61 as shown in FIG. 7A) in the airbag apparatus 60. For example, during transportation of the airbag apparatus 60, the retainer 30 maintains a space into which the inflator 20 is inserted and received (an accommodation portion 51 shown in FIG. 8). That is, the retainer 30 prevents the space (the accommodation portion 51) from losing shape.

Figure 1:
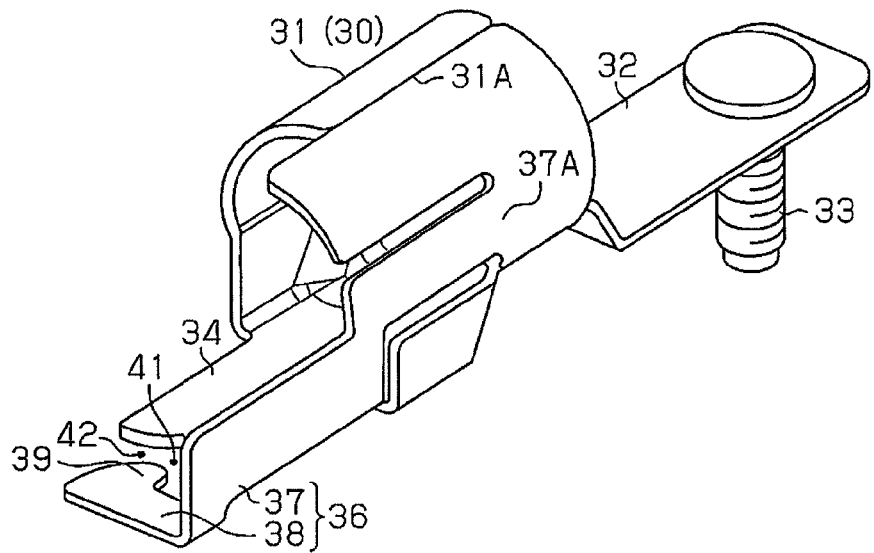
FIG. 1 is a perspective view illustrating a retainer to be installed in a gas generator according to a first embodiment.
Figure 2:
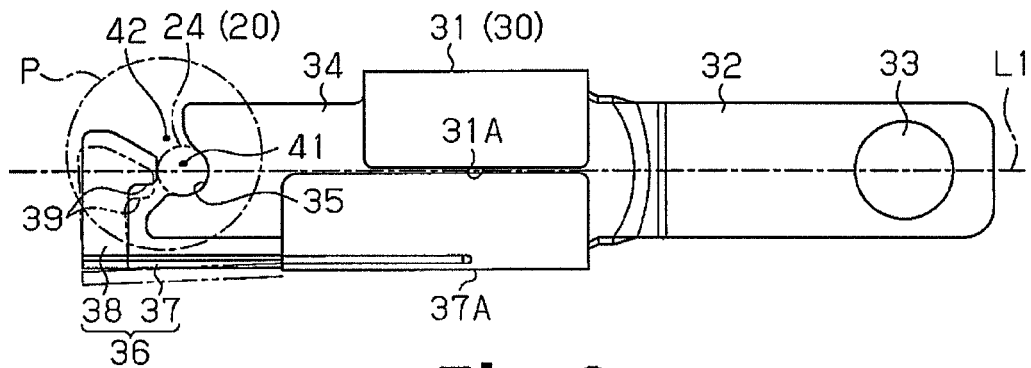
FIG. 2 is a plan view showing the retainer of the first embodiment.
Figure 6:
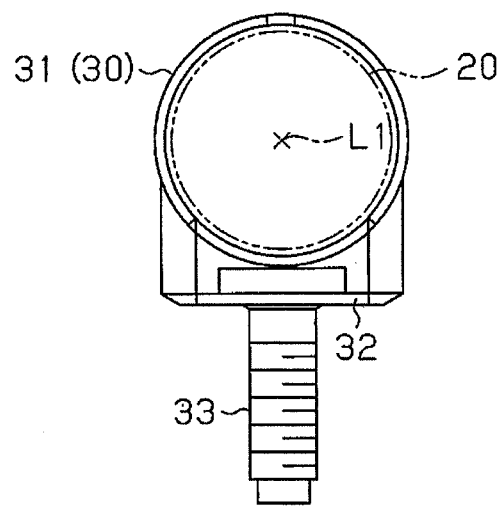
FIG. 6 is a rear view showing the retainer of the first embodiment.

As shown in FIGS. 1, 2 and 6, the retainer 30 has a holding portion 31, which is formed in a part (middle part in the present embodiment) in the direction of the axis L1. In the first embodiment, the holding portion 31 is formed to have a tubular shape with open ends (substantially cylindrical shape) that extends in the direction of the axis L1. The holding portion 31 has a cut 31A, which extends over the entire length of the holding portion 31 in the direction of the axis L1, formed in the upper part. The cut 31A is formed when a plate is bent to form the holding portion 31. In the present embodiment, the cut 31A has a narrow width. The shape and size of the holding portion 31 are determined such that a part of the inflator 20 except for the attaching protrusion 24 can be inserted, and that the inflator 20 is rotational about the axis L1. When the inflator 20, which is received by the holding portion 31, is moved in the direction of the axis L1, the holding portion 31 guides the movement of the inflator 20. When the inflator 20, which is received by the holding portion 31, is rotated, the holding portion 31 guides the rotation while restricting wobbling of the axis L1.

An attaching plate portion 32 extends in the direction of the axis L1 from a first end (right side as viewed in FIGS. 1 and 2) of the holding portion 31. Specifically, the attaching plate portion 32 extends from part in the circumference of the holding portion 31. The attaching plate portion 32 has an attaching protrusion 33 at an end that is not connected to the holding portion 31 (right side as viewed in FIGS. 1 and 2). The attaching protrusion 33 fastens and fixes the retainer 30 to the vehicle component 11 together with the airbag 50 (see FIG. 12). The attaching protrusion 33 is formed by a bolt that protrudes from the attaching plate portion 32 in a direction intersecting the axis L1. In this embodiment, the bolt protrudes in a direction perpendicular to the axis L1 (downward as viewed in FIG. 1).

Figure 4:
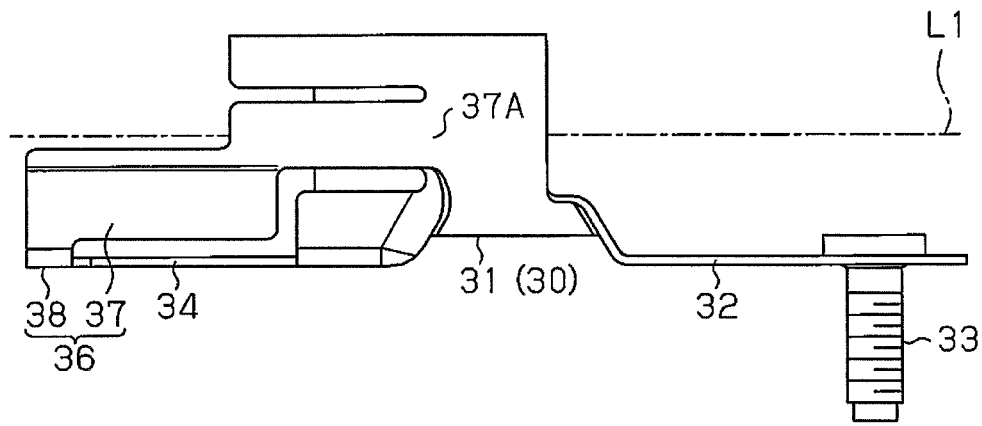
FIG. 4 is a side view showing the retainer of the first embodiment.
Figure 5:
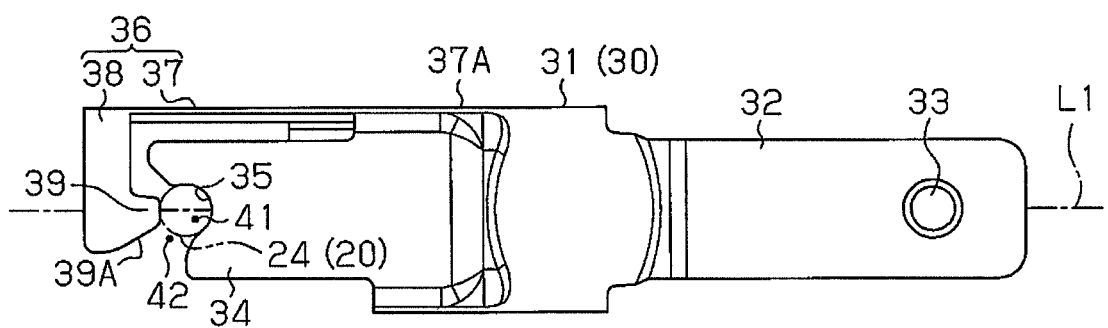
FIG. 5 is a bottom view showing the retainer of the first embodiment.

As shown in FIGS. 4 and 5, an engagement base 34 and a tongue piece 36 extend in the direction of the axis L1 from a second end (left side as viewed in FIGS. 4 and 5) of the holding portion 31. The tongue piece 36 is formed at one location that is separated (upward as viewed in FIG. 5) from the engagement base 34 in the circumferential direction of the holding portion 31. The engagement base 34 is formed substantially as a flat plate and substantially parallel with the attaching plate portion 32.

When the inflator 20 rotates, the attaching protrusion 24 pivots about the axis L1 and pushes the tongue piece 36. At this time, the tongue piece 36 is elastically deformed away from the engagement base 34 in the circumferential direction of the holding portion 31. For this purpose, the tongue piece 36 includes an elastic portion 37, which extends from a position that is slightly separated from the engagement base 34 in the circumferential direction of the holding portion 31. The elastic portion 37 is formed substantially as a flat plate and substantially perpendicular to the engagement base 34. Therefore, a direction perpendicular to the plane of the elastic portion 37 (thickness direction) substantially matches with the direction along the plane of the engagement base 34. Thus, when a force along the plane of the engagement base 34 is applied, the engagement base 34 is elastically deformed in that direction by a small amount, whereas the tongue piece 36 is more easily elastically deformed than the engagement base 34 about a fulcrum, which is a boundary 37A between the elastic portion 37 and the holding portion 31.

The elastic portion 37 extends in the direction of the axis L1 away from the attaching protrusion 33 and is longer than the engagement base 34. The tongue piece 36 includes an acting portion 38 formed by bending at the distal end, that is, at an end away from the attaching protrusion 33 (left side as viewed in FIG. 5). The acting portion 38 is located at an edge of the elastic portion 37 that is close to the engagement base 34 (lower side as viewed in FIG. 1). The acting portion 38 is formed substantially as a flat plate and is located in the same plane as the engagement base 34. The acting portion 38 is separated in the direction of the axis L1 from the engagement base 34.

The engagement base 34 includes a first engagement portion 35 at an end that is away from the attaching protrusion 33, that is, at the distal end. The tongue piece 36 includes a second engagement portion 39 in the acting portion 38. When the inflator 20 is assembled to the retainer 30, the attaching protrusion 24 is engaged with the first engagement portion 35 and the second engagement portion 39.

The engagement portions 35, 39 face each other in the direction of the axis L1 to clamp the attaching protrusion 24 from opposite sides in that direction. The space between the engagement portions 35, 39 is an engagement space 41, which is substantially circular in a plan view. When the inflator 20 is rotated about the axis L1 with part of the inflator 20 covered with the holding portion 31, the attaching protrusion 24 enters and is engaged with the engagement space 41. To allow the attaching protrusion 24 to enter the engagement space 41 when the inflator 20 rotates, the engagement space 41 has an inlet 42 at a position separated in the circumferential direction of the holding portion 31 from the tongue piece 36 (substantially in the upper portion as viewed in FIG. 2).

Figure 3:
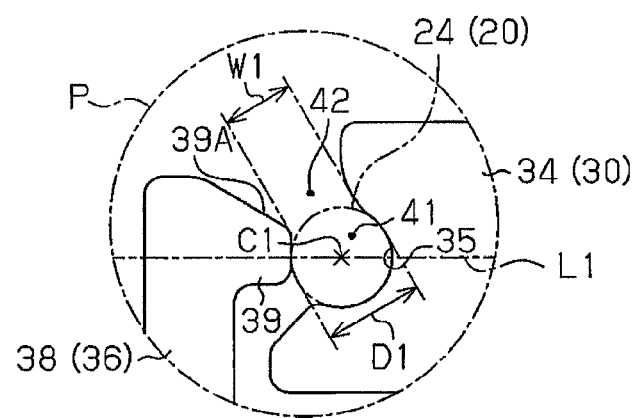
FIG. 3 is an enlarged partial plan view illustrating section P in FIG. 2.

As illustrated in FIG. 3, the first engagement portion 35 is a recess that is recessed away from the second engagement portion 39 in the direction of the axis L1, that is, recessed rightward as viewed in FIG. 3. The recess is arcuate and has substantially the same curvature as the attaching protrusion 24. The second engagement portion 39 is formed by a projection that protrudes in the direction of the axis L1 toward the first engagement portion 35.

When the attaching protrusion 24 is not clamped by the first engagement portion 35 and the second engagement portion 39, that is, when the tongue piece 36 (the elastic portion 37) is not elastically deformed, the width W1 of the inlet 42 of the engagement space 41 is less than the size (outer diameter D1) of the attaching protrusion 24.

Further, an edge 39A of the second engagement portion 39 that faces the inlet 42 (upper side as viewed in FIG. 3) is inclined with respect to the axis L1 and extends toward the center C1 of the first engagement portion 35.

A major part of the retainer 30, which has the above described structure, is formed by cutting and bending a plate, such as a metal plate. Particularly, the holding portion 31 is formed by curving a flat plate substantially into a tubular shape. The above described cut 31A is formed at the bending.

Next, the airbag 50, which forms the airbag apparatus 60 (see FIG. 11) together with the gas generator 10, will be described.

<Airbag 50>

As shown in FIG. 8, the airbag 50 is formed by sewing a base fabric sheet 55 (also referred to as a fabric panel) into a bag shape. The base fabric sheet 55 is preferably formed of a material having high strength and flexibility to be easily folded. The material may be, for example, woven cloth formed of polyester threads or polyamide threads.

Figure 7B:
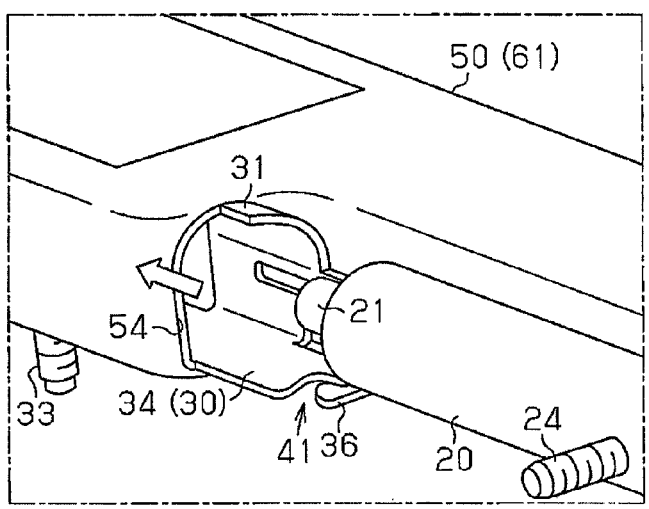
Figure 7C:
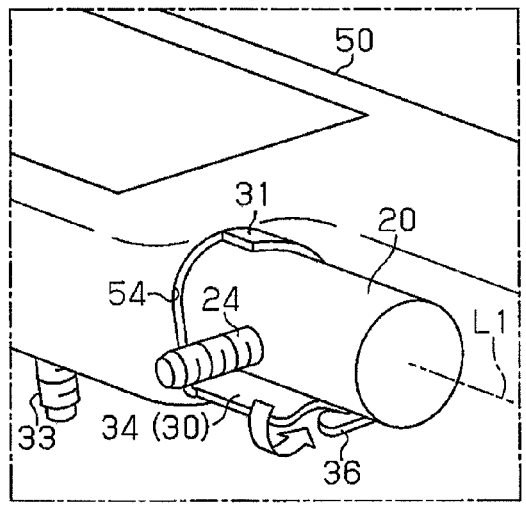
Figure 7D:
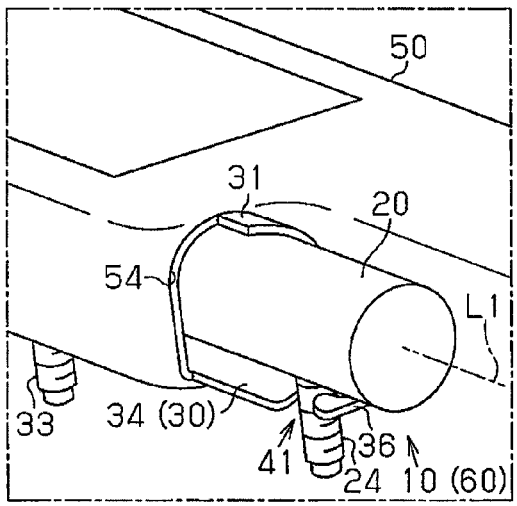

As shown in FIGS. 7A, 7D, and FIG. 8, the airbag 50 includes an accommodation portion 51, which is a space for receiving a part of the gas generator 10. The accommodation portion 51 has an insertion port 54. The insertion port 54 is sufficiently large for allowing the holding portion 31 and the inflator 20 (except the attaching protrusion 24) to pass therethrough. The accommodation portion 51 has a passage hole 53 at a position separated from the insertion port 54 toward the inside of the accommodation portion 51. The passage hole 53 has a diameter slightly larger than the attaching protrusion 33 of the retainer 30.

During its production (assembly), the airbag apparatus 60 takes on a transitional form, in which only the retainer 30 of the gas generator 10 is secured to the airbag 50 (the accommodation portion 51). To distinguish the form of the airbag apparatus 60 at this time from the completed airbag apparatus 60, the form is referred to as a transitional assembly 61 (refer to FIG. 7A). The transitional assembly 61 is designed as a form for transportation (a transitional form for distribution)

that is optimal for being transported between two different manufacturing sites (a first manufacturing site and a second manufacturing site).

Next, operation of the first embodiment will be described with reference to FIGS. 7A to 11, together with a method for assembling the airbag apparatus 60 using the above described components. In this assembling method, a preparation process, an insertion process, and attachment process are performed sequentially. The preparation process is performed at the first manufacturing base, and the insertion process and the attachment process are performed at the second manufacturing base. Each process will now be described.

<Preparation Process>

As shown in FIGS. 7A and 8, the transitional assembly 61 of the airbag apparatus 60 is prepared in the preparation process. In the transitional assembly 61, part of the retainer 30, that is, the entire attaching plate portion 32, and a major part of the holding portion 31 are arranged in the accommodation portion 51 of the airbag 50. Part of the engagement base 34 and the tongue piece 36 and part of the holding portion 31 are exposed outside the accommodation portion 51 of the airbag 50. Also, the attaching protrusion 33 is passed through the passage hole 53 of the base fabric sheet 55 from the interior of the accommodation portion 51 to the outside (from the upper side toward the lower side as viewed in FIG. 8). Therefore, the attaching protrusion 33 secures the retainer 30 to the accommodation portion 51 of the airbag 50.

The transitional assembly 61 is obtained by passing the attaching protrusion 33 of the retainer 30 through the passage hole 53 to secure the retainer 30 to the base fabric sheet 55 in the process of the sewing of the airbag 50, and thereafter resuming the sewing process of the airbag 50. This configuration is advantages since the insertion port 54 can be made small. That is, the insertion port 54 need not be large enough to allow the attaching protrusion 33 pass through, but only needs to be larger at least than the outer measurement of the holding portion 31.

Alternatively, after the sewing process of the airbag 50, the retainer 30 may be secured to the base fabric sheet 55 by inserting part of the retainer 30, that is, the attaching protrusion 33, the attaching plate portion 32, and the holding portion 31 into the accommodation portion 51 through the insertion port 54, and passing the attaching protrusion 33 through the passage hole 53. In this case, however, the insertion port 54 needs to be large enough to allow the retainer 30, which has the attaching protrusion 33, to pass through. Thus, the insertion port 54 has a larger size than in a case where the retainer 30 is secured during the process of sewing of the airbag 50. This is because the protrusion 33, together with the retainer 30, needs to be passed through the insertion port 54.

In the transitional assembly 61, a major part of the airbag 50 except the accommodation portion 51 are folded. The accommodation portion 51 and the folded part of the airbag 50 are wrapped with a wrapping means such as a wrapping sheet (not shown). However, the insertion port 54 is exposed.

In the transitional assembly 61, the retainer 30 maintains the space for receiving and accommodating the inflator 20, that is, the accommodation portion 51, and prevents the space from losing shape. Particularly, the holding portion 31 maintains the opening state of the insertion port 54.

<Insertion Process>

In the insertion process, outside the airbag 50, part of the inflator 20 is inserted into the interior (the accommodation portion 51) of the airbag 50 in the transitional assembly 61 from the first end (the gas outlet 21) through the insertion port 54, as indicated by the arrow in FIG. 7B. At this time, since the insertion port 54 is maintained to the open state by the holding portion 31, the inflator 20 can be easily inserted into the insertion port 54. The inflator 20 is inserted while being in an orientation in which the attaching protrusion 24 projects in a direction intersecting the attaching protrusion 33 (a perpendicular direction as viewed in FIG. 7B). The attaching protrusion 24 serves as a part to be attached to the vehicle component 11 and also as a positioning protrusion that determines the position of the inflator 20 relative to the retainer 30.

<Attachment Process>

In the attachment process, the part of the inflator 20 that has been inserted into the insertion port 54 is inserted into the holding portion 31 of the retainer 30. In the first embodiment, in which the holding portion 31 is arranged to extend over inside and outside of the insertion port 54, part of the inflator 20 is inserted into the holding portion 31 substantially at the same time as it is inserted into the insertion port 54. As shown in FIG. 7C, the inflator 20 is inserted until the attaching protrusion 24 of the inflator 20 is close to the insertion port 54 of the accommodation portion 51.

Next, as indicated by the arrows in FIGS. 7C and 9, a force that acts to rotate the inflator 20 counterclockwise as viewed in FIG. 9 about the axis L1 is applied to the inflator 20 so that the attaching protrusion 24 increases the width W1 of the inlet 42 of the engagement space 41. At this time, the holding portion 31 functions to guide the rotation of the inflator 20 (to prevent wobbling of the axis L1). Also, as indicated by solid lines of FIG. 10A, the attaching protrusion 24 is restricted from entering the engagement space 41 through the inlet 42. This is because the width W1 of the inlet 42 of the engagement space 41 is narrower than the outer diameter D1 of the attaching protrusion 24 as shown in FIG. 3.

The above described force, which acts to rotate the inflator 20, is transmitted to the second engagement portion 39 via the attaching protrusion 24 and the inclined edge 39A. At this time, the direction of movement of the attaching protrusion 24 due to the rotation of the inflator 20 is substantially the same as the thickness direction of the elastic portion 37 of the tongue piece 36. Accordingly, the tongue piece 36 is easily elastically deformed substantially downward in FIG. 2 in the circumferential direction of the holding portion 31 to increase the width W1 of the inlet 42 as indicated by the arrow of a solid line in FIG. 10A about a fulcrum, which is its basal end, or an end at which the second engagement portion 39 is not formed (the boundary 37A with the holding portion 31 of the elastic portion 37).

Figure 10A:
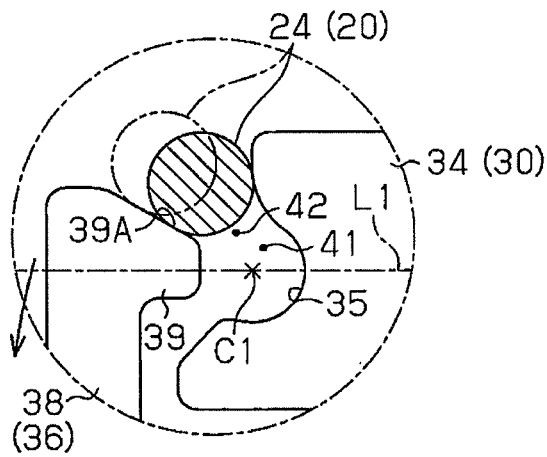
FIGS. 10A to 10C are partial plan views corresponding to FIG. 3, illustrating a process in which an attaching protrusion of the inflator is engaged with an engagement portion of the retainer in the first embodiment.
Figure 10B:
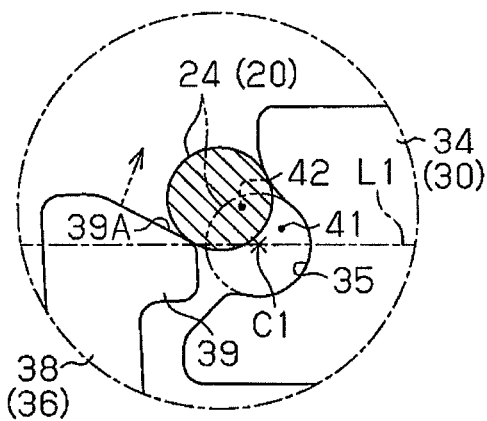
Figure 10C:
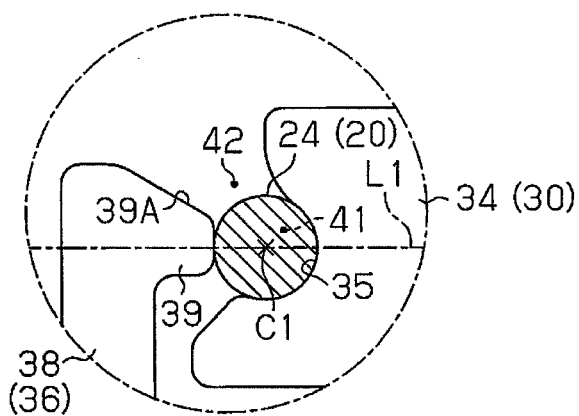

At the elastic deformation, the second engagement portion 39 is moved away from the first engagement portion 35 in the circumferential direction of the holding portion 31 as shown in FIG. 10B, so that the width W1 of the inlet 42 is increased. Also, since the edge 39A is inclined relative to the axis L1 and extends toward the center C1 of the first engagement portion 35, the attaching protrusion 24 slides on the edge 39A as the inflator 20 rotates, so that the attaching protrusion 24 is guided by the first engagement portion 35. When the width W1 of the inlet 42 is increased to be greater than the size (the outer diameter D1) of the attaching protrusion 24, the attaching protrusion 24 can enter into the engagement space 41. As shown in FIG. 10C, with the attaching protrusion 24, which has a circular cross-sectional shape, in the engagement space 41, part of the attaching protrusion 24 is engaged with the arcuate first engagement portion 35, which has substantially the same curvature as that of the protrusion 24, with no or little clearance.

At this time, since the engagement portions 35, 39 are exposed from the airbag 50 (the accommodation portion 51), the engagement of the attaching protrusion 24 with the engagement portions 35, 39 occurs outside the airbag 50 (the accommodation portion 51). Therefore, compared to a case in which the engagement portions 35, 39 are located inside the airbag 50 (the accommodation portion 51), including a case in which the engagement portions 35, 39 are located further inward than the attaching protrusion 33, the visibility is improved and the attaching protrusion 24 can be easily engaged with the engagement portions 35, 39.

The inflator 20 rotates along the plane of the engagement base 34. Thus, if the attaching protrusion 24 pushes the engagement base 34, the amount of elastic deformation in a direction along the plane of the engagement base 34 is small.

Also, when the attaching protrusion 24 enters the engagement space 41 as described above, the tongue piece 36, which has been elastically deformed, acts to restore its original shape to reduce the width W1 of the inlet 42 substantially in the circumferential direction of the holding portion 31 by the own elastic shape restoring force, as indicated by the arrow of a broken line in which a long dash alternates with a pair of short dashes in FIG. 10B. Due to the elastic shape restoration, the second engagement portion 39 of the tongue piece 36 pushes the attaching protrusion 24 in the direction of the axis L1 toward the first engagement portion 35. As shown in FIGS. 7D and 10C, the attaching protrusion 24 becomes clamped by the first engagement portion 35 and the second engagement portion 39 from opposite sides in the direction of the axis L1. In this state, the direction of the elastic shape restoration is substantially the same as the thickness direction of the elastic portion 37. Therefore, the amount of the elastic shape restoration of the tongue piece 36 is great so that there is no or little clearance between the engagement portions 35, 39 and the attaching protrusion 24. The position of the attaching protrusion 24 in the direction of the axis L1 is determined, so that the rattling of the inflator 20 in that direction is reduced.

Also, the position of the inflator 20 in the circumferential direction is determined by the engagement with the first engagement portion 35 of the attaching protrusion 24, so that rattling in that direction is reduced. In this state, the attaching protrusion 24 is substantially parallel with the attaching protrusion 33.

In this manner, the attaching protrusion 24 is engaged with the engagement portions 35, 39 of the retainer 30, so that the inflator 20 is attached to the transitional assembly 61 with its position determined. The intended airbag apparatus 60 is thus obtained.

The inflator 20 is installed simply by inserting the inflator 20 into the holding portion 31 and rotating the inflator 20 about the axis L1. The load required to rotate the inflator 20 changes before and after the attaching protrusion 24 is engaged with the first engagement portion 35. That is, prior to the engagement of the attaching protrusion 24 with the first engagement portion 35, the operating load increases as the inflator 20 rotates further. When the attaching protrusion 24 is engaged with the first engagement portion 35, the operating load abruptly decreases. This provides a clicking sensation, which improves the operational sensation.

When detaching the inflator 20 from the retainer 30, the inflator 20 is rotated in a direction reverse to that in the assembly, that is, in a direction to separate away from the first engagement portion 35 in the circumferential direction of the holding portion 31. The rotating direction of the inflator 20 at this time is different from the direction of the elastic deformation of the tongue piece 36 (the elastic portion 37) to widen the inlet 42. Therefore, the inflator 20 needs to be rotated by a greater force than when the inflator 20 is assembled to the retainer 30. This means that, once clamped by the first engagement portion 35 and the second engagement portion 39, the attaching protrusion 24 is hard to escape (hard to be removed) from the engagement space 41.

Figure 13:
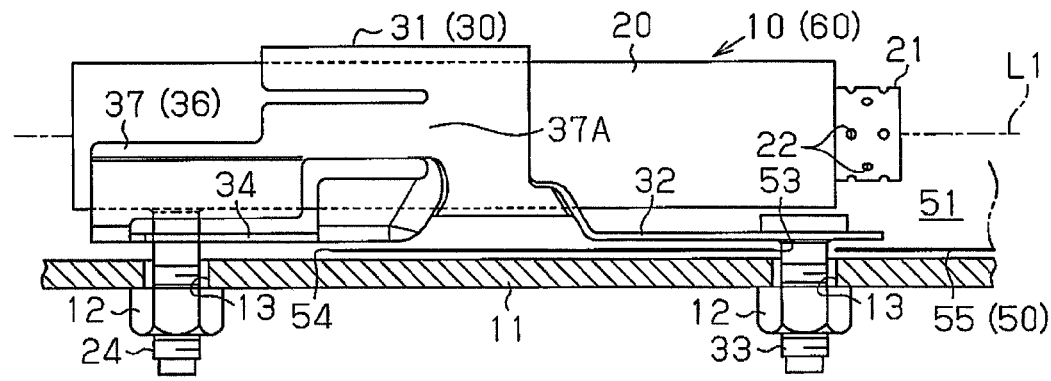
FIG. 13 is a partial cross-sectional side view illustrating the airbag apparatus after being fixed in a vehicle in the first embodiment.

The attaching protrusion 24, 33 of the airbag apparatus 60, which has been produced by the above described procedure, are passed through passage holes 13 formed in the vehicle component 11 (a frame). The passage is carried out by regulating the orientation such that the attaching protrusion 24, 33 project toward the passage holes 13, and then moving the airbag apparatus 60 toward the vehicle component 11 (the frame). Further, nuts 12 are threaded and fastened to the attaching protrusions 24, 33, which have been passed through the vehicle component 11. Then, as shown in FIG. 13, the retainer 30 is fixed to the vehicle component 11 together with the airbag 50 by the attaching protrusion 33 and the nut 12. Also, the inflator 20, which is assembled to the retainer 30, is fixed to the vehicle component 11 together with the retainer 30 by the attaching protrusion 24 and the nut 12.

As described above, the retainer 30 and the inflator 20 are both directly fixed to the vehicle component 11. Thus, compared to a case in which an inflator is not directly fixed to a vehicle component, but indirectly fixed to a vehicle component via a retainer, the retainer 30 and the inflator 20 are both firmly fixed to the vehicle component 11.

Also, the attaching protrusion 33 and the attaching protrusion 24 both project in a direction intersecting (perpendicular to) the axis L1. The operation for fixing the attaching protrusion 33, 24 to the vehicle component 11 is carried out substantially in the same direction. Therefore, the inflator 20 and the retainer 30 are easily fixed to the vehicle component 11 as compared to a case in which, for example, an attaching protrusion of a retainer protrudes in a direction intersecting (perpendicular to) the axis of an inflator, an attaching protrusion of the inflator projects in the axial direction, and the direction of the operation for fixing the attaching protrusions to the vehicle component are significantly different from each other.

In the airbag apparatus 60 before being fixed to the vehicle component 11 (see FIG. 11), the attaching protrusion 24, 33 are fixed to separate members (the inflator 20, and the retainer 30), and the attaching protrusion 33 is passed through the pliable airbag 50. Therefore, for example, when the inflator 20 receives a great force in the circumferential direction via the attaching protrusion 24, the attaching protrusion 24 may possibly escape from the engagement space 41.

However, in a state in which the airbag apparatus 60 is fixed to the vehicle component 11 as described above (see FIG. 13), both attaching protrusion 24, 33 are fixed to the rigid vehicle component 11 (the frame). Thus, even if the attaching protrusion 24 receives a force, the attaching protrusion 24 is unlikely to be moved in any direction. Thus, the attaching protrusion 24 is unlikely to escape from the engagement space 41.

When a vehicle equipped with the above described airbag apparatus 60 receives an impact due to, for example, a collision while moving, the impact is detected by a sensor (not shown). In response to a detection signal of the sensor, a control unit (not shown) delivers an activation signal to the inflator 20 via a harness (not shown). In response to the activation signal, the gas generating agent of the inflator 20 generates gas, which is ejected outward in the radial direction via the gas ports 22 of the gas outlet 21. When receiving the gas, the airbag 50 is inflated in the vicinity of the occupant while being unfolded (deployed), thereby reducing the impact to protect the occupant.

The first embodiment as described above has the following advantages.

(1) A positioning protrusion (the attaching protrusion 24) for determining the position of the retainer 30 is formed on the outer surface of the inflator 20 (FIG. 8). The retainer 30 includes the engagement base 34, which extends in the direction of the axis L1 of the inflator 20, and the tongue piece 36, which extends in the direction of the axis L1 of the inflator 20 and from a position separated from the engagement base 34 in the circumferential direction of the holding portion 31. The first engagement portion 35 is formed at the distal end of the engagement base 34, and the second engagement portion 39 is formed at the distal end of the tongue piece 36. The first engagement portion 35 and the second engagement portion 39 face each other to form therebetween the engagement space (FIG. 2), into which the positioning protrusion (the attaching protrusion 24) enter.

The width W1 of the inlet 42 of the engagement space 41 is less than the size (the outer diameter D1) of the attaching protrusion 24 (FIG. 3). When the inflator 20 is rotated such that the positioning protrusion (the attaching protrusion 24) widens the width W1 of the inlet 42, the positioning protrusion (the attaching protrusion 24) pushes the tongue piece 36. The tongue piece 36 is elastically deformed to increase the width W1 of the inlet 42 with its basal end (the boundary 37A with the holding portion 31) as indicated by the broken line in which a long dash alternates with a pair of short dashes in FIG. 2.

Therefore, the inflator 20 is assembled to the retainer 30 by simply being rotated after being inserted into the holding portion 31. The present embodiment eliminates processes as disclosed in Japanese Laid-Open Patent Publication No. 2011-121469, or the process for passing the bolt of the inflator through the longitudinal section, the process for sliding the bolt along the longitudinal section, and the process for moving the bolt in the circumferential direction of the holding portion along the short transverse section. This simplifies the assembling procedure.

Since the attaching protrusion 24 is clamped by the first engagement portion 35 and the second engagement portion 39 with no or little clearance in the direction of the axis L1, rattling of the inflator 20 after assembly is reduced.

(2) The attaching protrusions 24, 33 are formed on the outer surface of the inflator 20 and the outer surface of the retainer 30, respectively. The positioning protrusion is formed by the attaching protrusion 24 of the inflator 20 and functions to determine the position of the inflator 20 relative to the retainer 30 (FIG. 8).

Thus, the gas generator 10 can be fixed to the vehicle by attaching the inflator 20 and the retainer 30 to the vehicle component 11 using the attaching protrusion 24, 33 (FIG. 11).

Since the attaching protrusion 24 is used as a positioning protrusion, no positioning protrusion other than the attaching protrusion 24 needs to be provided in the inflator 20. It is therefore possible to reduce the number of components of the inflator 20 and the gas generator 10.

(3) The tongue piece 36 has the elastic portion 37. When the inflator 20 is rotated and the tongue piece 36 is pushed by the attaching protrusion 24, the elastic portion 37 is elastically deformed in the thickness direction (FIG. 2).

Thus, as the inflator 20 rotates, the tongue piece 36 can be greatly elastically deformed to increase the width W1 of the inlet 42 of the engagement space 41 about a fulcrum, which is its basal end (the boundary 37A with the holding portion 31 of the elastic portion 37). When the attaching protrusion 24 enters into the engagement space 41, the tongue piece 36 (the elastic portion 37) can be greatly elastically deformed to restore the original shape, so that so that the attaching protrusion 24 (positioning protrusion) is clamped by the first engagement portion 35 and the second engagement portion 39 with no or little clearance.

(4) The tongue piece 36 is located at a position separated from the engagement base 34 in the circumferential direction of the holding portion 31. The first engagement portion 35 is formed at the distal end of the engagement base 34, and the second engagement portion 39 is formed at the distal end of the tongue piece 36. The first engagement portion 35 and the second engagement portion 39 face each other in the direction of the axis L1. The inflator 20 is rotational about the axis L1 with part thereof covered with the holding portion 31. As the inflator 20 rotates, the tongue piece 36 is pushed by the attaching protrusion 24 and elastically deformed to be moved away from the engagement base 34 in the circumferential direction of the holding portion 31 (refer to a broken line in which a long dash alternates with a pair of short dashes in FIG. 2).

Therefore, by rotating the inflator 20, the tongue piece 36 can be elastically deformed in the circumferential direction of the holding portion 31 to increase the width W1 of the inlet 42. Also, by causing the attaching protrusion 24 to enter into the engagement space 41, the tongue piece 36 can elastically restore its original shape in the circumferential direction of the holding portion 31 to reduce the width W1.

(5) The first engagement portion 35 is formed to be recessed away from the second engagement portion 39 in the direction of the axis L1 to receive part of the attaching protrusion 24. Also, the second engagement portion 39 is formed by a protrusion that protrudes toward the first engagement portion 35 (FIG. 3).

Therefore, by elastically pressing the attaching protrusion 24, which is engaged with the first engagement portion 35, by the second engagement portion 39, the attaching protrusion 24 can be clamped by the first engagement portion 35 and the second engagement portion 39.

(6) The attaching protrusion 24 has a circular cross-sectional shape. Also, the first engagement portion 35 is arcuate and is formed to have substantially the same curvature as the attaching protrusion 24 (FIG. 3).

Therefore, by engaging part of the attaching protrusion 24 with the first engagement portion 35, rattling of the inflator 20 in the circumferential direction is reduced.

(7) The edge 39A of the second engagement portion 39 that faces the inlet 42 is inclined with respect to the axis L1 and extends toward the center C1 of the first engagement portion 35 (FIG. 3).

Therefore, as the inflator 20 rotates, the attaching protrusion 24 is guided to the first engagement portion 35 by sliding motion of the attaching protrusion 24 on the edge 39A. This further facilitates the assembly of the inflator 20.

(8) The airbag apparatus 60 includes the airbag 50 and the gas generator 10, which achieves the advantages of the above items (1) to (7) (FIG. 11). The gas generator 10 is located inside the airbag 50 and generates gas to inflate the airbag 50 with the generated gas. The attaching protrusion 33 of the retainer 30 is passed through the passage hole 53 of the airbag 50, and the attaching protrusion 24, 33 are fastened to the vehicle component 11 (the frame of the seat), so that the gas generator 10 is fixed to the vehicle, together with the airbag 50 (FIG. 13).

Therefore, the airbag apparatus 60 is capable of achieving the advantage of item (1) of reduction in rattling of the assembled inflator 20, while facilitating the assembly of the inflator 20 to the retainer 30.

The airbag apparatus 60, which includes the gas generator 10 and the airbag 50, is fixed to the vehicle by a simple structure in which the attaching protrusion 24 of the inflator 20 and the attaching protrusion 33 of the retainer 30 passed through the airbag 50 are fastened to the vehicle component 11 (frame).

(9) Part of the inflator 20 is assembled to the retainer 30 in a narrow space, or inside the airbag 50 (the accommodation portion 51) (FIGS. 7A to 7D).

Thus, the gas generator 10, which achieves the advantages of items (1) to (7) is used as a gas generator, enhances the facilitation of assembly.

Second Embodiment

A gas generator and an airbag apparatus according to a second embodiment will now be described with reference to FIGS. 14 to 17B.

The second embodiment is different from the first embodiment in the structure of the engagement base 34 and a tongue piece in the retainer 30. The differences between the second embodiment and the first embodiment will be mainly discussed.

An inflator 20 is configured to be movable (in a straightly line) in the direction of the axis L1 with part of the inflator 20 covered with a holding portion 31.

Figure 14:
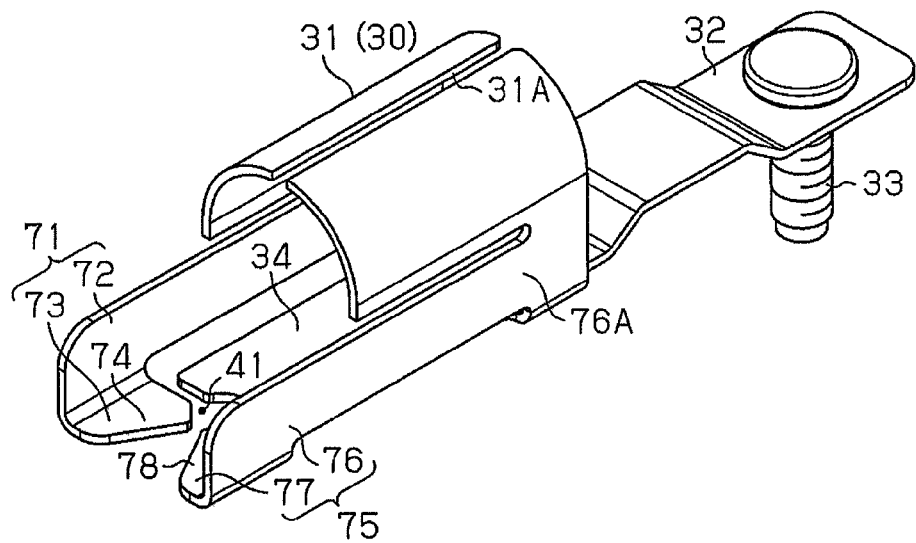
FIG. 14 is a perspective view illustrating a retainer to be installed in a gas generator according to a second embodiment.
Figure 15:
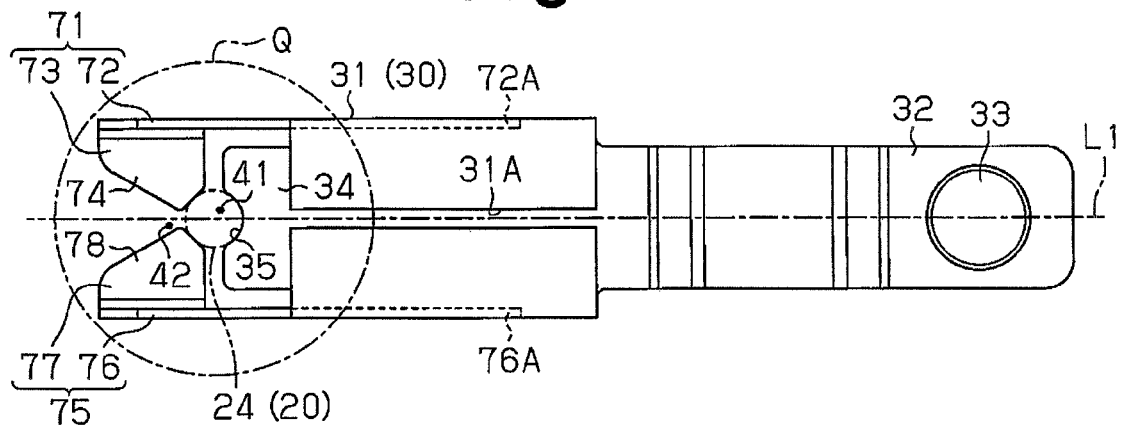
FIG. 15 is a plan view showing the retainer of the second embodiment.

As shown in FIGS. 14 and 15, the holding portion 31 of the retainer 30 has a single engagement base 34 and a pair of tongue pieces (first and second tongue pieces) 71, 75, which extend in the direction of the axis L1 and away from the attaching protrusion 33. The first tongue piece 71 and the second tongue piece 75 are located on opposite sides of the engagement base 34 in the circumferential direction of the holding portion 31. In other words, the first tongue piece 71 and the second tongue piece 75 are located on opposite sides of the engagement base 34 in the circumferential direction the holding portion 31.

The engagement base 34 is formed substantially as a flat plate. The engagement base 34 extends in the direction of the axis L1 away from the attaching protrusion 33 and is longer than the holding portion 31.

When pressed by the attaching protrusion 24, which moves in the direction of the axis L1 together with the inflator 20, the first tongue piece 71 and the second tongue piece 75 are elastically deformed away from each other in the circumferential direction of the holding portion 31. To be elastically deformed, the first tongue piece 71 and the second tongue piece 75 have elastic portions 72, 76, respectively, which extend from positions separated from the engagement base 34 in the circumferential direction of the holding portion 31. The elastic portions 72, 76 are each formed substantially as a flat plate and substantially perpendicular to the engagement base 34. Therefore, a direction perpendicular to the plane of the elastic portions 72, 76 (thickness direction) substantially matches with the direction along the plane of the engagement base 34. Thus, when a force along the plane of the engagement base 34 is applied, the engagement base 34 is elastically deformed in that direction by a small amount, whereas the first tongue piece 71 and the second tongue piece 75 are likely to be elastically deformed by a greater amount than the engagement base 34 about fulcrums, which are boundaries 72A, 76A between the elastic portions 72, 76 and the holding portion 31.

The elastic portions 72, 76 of the tongue pieces 71, 75 extend in the direction of the axis L1 away from the attaching protrusion 33 and are longer than the engagement base 34. The first tongue piece 71 and the second tongue piece 75 respectively include acting portions 73, 77 formed by bending the distal ends, that is, the ends away from the attaching protrusion 33 (left side as viewed in FIG. 15). The acting portions 73, 77 are located at edges of the elastic portions 72, 76 that are close to the engagement base 34 (lower side as viewed in FIG. 14). The acting portions 73, 77 are each formed substantially as a flat plate and are each located substantially in the same plane as the engagement base 34. The acting portions 73, 77 face each other in the circumferential direction of the holding portion 31.

The engagement base 34 includes a first engagement portion 35 at an end that is away from the attaching protrusion 33, that is, at the distal end that is away from the attaching protrusion 33 in the direction of the axis 11 (left side as viewed in FIG. 15), at the center in the circumferential direction of the holding portion 31. The first tongue piece 71 includes a second engagement portion 74 in the acting portion 73. The second tongue piece 75 includes a second engagement portion 78 in the acting portion 77.

When the inflator 20 is assembled to the retainer 30, the attaching protrusion 24 is engaged with the first engagement portion 35 and the second engagement portions 74, 78. The second engagement portions 74, 78 face each other in the circumferential direction of the holding portion 31. The first engagement portion 35 is separated and faces the second engagement portions 74, 78 in the direction of the axis L1, and the first engagement portion 35 and the second engagement portions 74, 78 clamp the attaching protrusion 24 from opposite sides in that direction. The space between the first engagement portion 35 and the second engagement portions 74, 78 is an engagement space 41, which is substantially circular in a plan view. When the inflator 20 is moved in the direction of the axis L1 with part of the inflator 20 covered with the holding portion 31, the attaching protrusion 24 enters and is engaged with the engagement space 41.

To allow the attaching protrusion 24 to enter the engagement space 41 when the inflator 20 moves, the engagement space 41 has an inlet 42 at a position separated in the direction of the axis L1, or in a space between the second engagement portions 74, 78 in the present embodiment.

Figure 16:
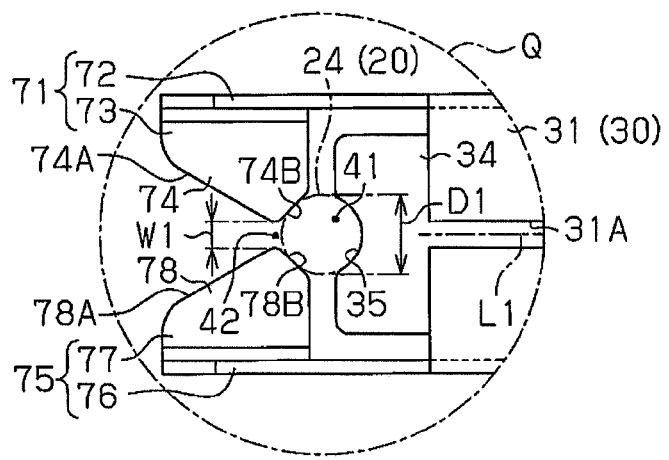
FIG. 16 is an enlarged partial plan view illustrating section Q in FIG. 15.

As illustrated in FIG. 16, the first engagement portion 35 is a recess that is recessed away from the second engagement portions 74, 78 in the direction of the axis L1, that is, recessed rightward as viewed in FIG. 16. The recess is arcuate and has substantially the same curvature as the attaching protrusion 24, which has a circular cross-sectional shape.

The second engagement portion 74 of the first tongue piece 71 is formed as a protrusion that protrudes in the circumferential direction of the holding portion 31 and toward the second engagement portion 78 of the second tongue piece 75. The second engagement portion 78 of the second tongue piece 75 is formed as a protrusion that protrudes in the circumferential direction of the holding portion 31 and toward the second engagement portion 74 of the first tongue piece 71.

In a state in which the attaching protrusion 24 is not clamped by the first engagement portion 35 and the second engagement portions 74, 78, that is, in a state in which the tongue pieces 71, 75 (the elastic portions 72, 76) are not elastically deformed, the width W1 of the inlet 42 of the engagement space 41 is less than the size (outer diameter D1) of the attaching protrusion 24.

The second engagement portions 74, 78 respectively have first inclined portions 74A, 78A at edges that are separated from the engagement base 34 in the direction of the axis L1. The first inclined portions 74A, 78A are inclined to approach each other toward the engagement base 34. Therefore, the clearance between the first inclined portions 74A, 78A decreases toward the engagement base 34.

The second engagement portions 74, 78 respectively have second inclined portions 74B, 78B at edges that are closer to the engagement base 34 in the direction of the axis L1. The second inclined portions 74B, 78B are inclined to separate away from each other toward the engagement base 34. Therefore, the clearance between the second inclined portions 74B, 78B increases toward the engagement base 34.

Other than these differences, the second embodiment is the same as the first embodiment. Therefore, like or the same reference numerals are given to those components that are like or the same as the corresponding components of the first embodiment and detailed explanations are omitted.

When the retainer 30 having the above described configuration is used, the insertion process and the attachment process are different from those in the first embodiment when the airbag apparatus 60 is assembled. The differences of the insertion process and the attachment process from those in the first embodiment will be mainly discussed.

<Insertion Process>

In the insertion process, outside the airbag 50, part of the inflator 20 is inserted into the interior (the accommodation portion 51) of the airbag 50 in the transitional assembly 61 from the first end (the gas outlet 21) through the insertion port 54. Unlike the first embodiment, the inflator 20 is inserted in an orientation with the attaching protrusion 24 protruding in a direction parallel with the attaching protrusion 33 in the second embodiment. The inflator 20 is moved in a straight line in the direction of the axis L1.

<Attachment Process>

In the attachment process, part of the inflator 20 is inserted into the holding portion 31 of the retainer 30 via the insertion port 54. During the insertion, the attaching protrusion 24 approaches the second engagement portions 74, 78.

Figure 17A:
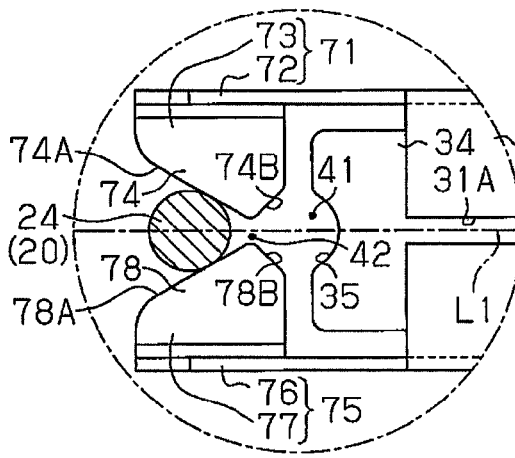
FIGS. 17A and 17B are partial plan views corresponding to FIG. 16, illustrating a process in which an attaching protrusion of the inflator is engaged with an engagement portion of the retainer in the second embodiment.

As indicated by solid lines of FIG. 17A, the attaching protrusion 24 is restricted from entering the engagement space 41 through the inlet 42. This is because the width W1 of the inlet 42 is narrower than the size (the outer diameter D1) of the attaching protrusion 24 as shown in FIG. 16.

Next, a force is applied to the inflator 20 to move the inflator 20 in the direction of the axis L1 against the restriction and toward the engagement base 34 (rightward as viewed in FIG. 17A), such that the attaching protrusion 24 increases the width W1 of the inlet 42. At this time, the holding portion 31 functions to guide the movement of the inflator 20 in the direction of the axis L1.

Figure 17B:
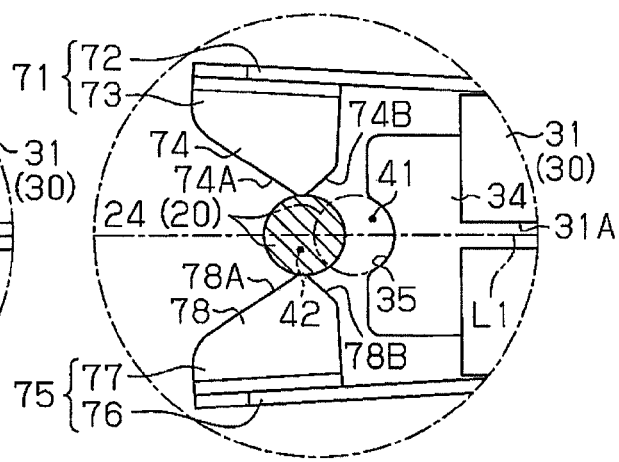

As shown in FIG. 17B, the above described force, which acts to move the inflator 20, is transmitted to the second engagement portions 74, 78 via the attaching protrusion 24 and the first inclined portions 74A, 78A. The direction in which the attaching protrusion 24 widens the clearance between the second engagement portions 74, 78 is substantially the same as the thickness direction of the elastic portions 72, 76 of the tongue pieces 71, 75. Accordingly, the tongue pieces 71, 75 are easily elastically deformed in the circumferential direction of the holding portion 31 to increase the width W1 of the inlet 42 about fulcrums, which are the basal ends, that is, the ends at which the second engagement portions 74, 78 are not formed (the boundaries 72A, 76A with the holding portion 31 of the elastic portions 72, 76).

With the elastic deformation, the first inclined portions 74A, 78A and the second inclined portions 74B, 78B of the second engagement portions 74, 78 are moved away from each other in the circumferential direction of the holding portion 31, so that the width W1 of the inlet 42 is increased. The first inclined portions 74A, 78A are inclined to approach each other toward the engagement base 34. Therefore, the attaching protrusion 24 is guided to the first engagement portion 35 while moving in the direction of the axis L1 and sliding on the first inclined portions 74A, 78A. When the width W1 of the inlet 42 is increased to be greater than the size (the outer diameter D1) of the attaching protrusion 24, that is, when the attaching protrusion 24 has gone past the first inclined portions 74A, 78A, the attaching protrusion 24 can enter the engagement space 41. When the attaching protrusion 24 has entered the engagement space 41 as indicated by broken lines in which a long dash alternates with a pair of short dashes in FIG. 16, part of the attaching protrusion 24 is engaged with the first engagement portion 35 with nor or little clearance.

The direction of movement of the inflator 20 is substantially the same as the direction along the plane of the engagement base 34. Thus, if the attaching protrusion 24 pushes the engagement base 34, the amount of elastic deformation in the direction of the engagement base 34 is small.

Also, when the attaching protrusion 24 enters the engagement space 41 as described above, the tongue pieces 71, 75, which have been elastically deformed, act to restore the original shapes to reduce the width W1 of the inlet 42 in the circumferential direction of the holding portion 31 by the elastic shape restoring force of the elastic portions 72, 76 of the tongue pieces 71, 75. Due to the elastic shape restoration, the second inclined portions 74B, 78B of the second engagement portions 74, 78 contact the protrusion 24. Through the contact, the second engagement portions 74, 78 push the attaching protrusion 24 toward the first engagement portion 35. The attaching protrusion 24 becomes clamped by the first engagement portion 35 and the second engagement portions 74, 78 from opposite sides in the direction of the axis L1. In this state, the direction of the elastic shape restoration of the tongue pieces 71, 75 is substantially the same as the thickness direction of the elastic portions 72, 76. Therefore, the amount of the elastic shape restoration of the tongue pieces 71, 75 is great so that there is no or little clearance between i) the attaching protrusion 24 and ii) the first engagement portion 35 and the second engagement portions 74, 78. The position of the attaching protrusion 24 in the direction of the axis L1 is determined, so that the rattling of the inflator 20 in that direction is reduced.

When the attaching protrusion 24 is engaged with the first engagement portion 35 as described above, the position of the attaching protrusion 24 is determined in the circumferential direction of the holding portion 31, so that rattling of the inflator 20 in that direction is reduced. In this state, the attaching protrusion 24 is substantially parallel with the attaching protrusion 33.

In this manner, the attaching protrusion 24 is engaged with the first engagement portion 35 and the second engagement portions 74, 78, so that the inflator 20 is attached to the transitional assembly 61 with its position determined. The intended airbag apparatus 60 is thus obtained.

As described, the inflator 20 is installed simply by inserting part of the inflator 20 into the holding portion 31 and moving the inflator 20 in the direction of the axis L1. The load required to move the inflator 20 changes before and after the attaching protrusion 24 is engaged with the first engagement portion 35. That is, prior to the engagement of the attaching protrusion 24 with the first engagement portion 35, in other words, during sliding motion of the protrusion 24 on the first inclined portions 74A, 78A, the operating load increases as the inflator 20 moves further. When the attaching protrusion 24 is engaged with the first engagement portion 35, the operating load abruptly decreases. This provides a clicking sensation, which improves the operational sensation.

The airbag apparatus 60 that is obtained in the above described procedure is fixed to the vehicle component 11 (the frame) as in the first embodiment.

Accordingly, in addition to the advantages of items (1) to (3), (6), (8), and (9), the second embodiment achieves advantages of items (4A) and (5A) in place of the advantages of items (4) and (5).

(4A) The first tongue piece 71 and the second tongue piece 75 are located on opposite sides of the engagement base 34 in the circumferential direction of the holding portion 31 (the upper side and the lower side as viewed in FIG. 15). The first engagement portion 35 is formed at the distal end of the engagement base 34, the second engagement portion 74 is formed at the distal end of the first tongue piece 71, and the second engagement portion 78 is formed at the distal end of the second tongue piece 75. The second engagement portions 74, 78 of the tongue pieces 71, 75 face each other in the circumferential direction of the holding portion 31. The first engagement portion 35 and the second engagement portions 74, 78 face each other in the direction of the axis L1. The inflator 20 is movable in the direction of the axis L1 with part thereof covered with the holding portion 31. As the inflator 20 moves, the tongue pieces 71, 75 are pushed by the attaching protrusion 24 and to be elastically deformed and moved away from the engagement base 34 in the circumferential direction of the holding portion 31 (FIG. 15).

Therefore, by moving the inflator 20 in the direction of the axis L1, the tongue pieces 71, 75 can be elastically deformed in the circumferential direction of the holding portion 31 to increase the width W1 of the inlet 42. Also, by causing the attaching protrusion 24 to enter into the engagement space 41, the tongue pieces 71, 75 can elastically restore the original shapes in the circumferential direction of the holding portion 31 to reduce the width W1.

(5A) The first engagement portion 35 is formed to be recessed away from the second engagement portions 74, 78 in the direction of the axis L1 to receive part of the attaching protrusion 24. One of the second engagement portions 74, 78 is formed by a protrusion that protrudes toward the other (FIG. 16).

Therefore, by elastically pressing the attaching protrusion 24, which is engaged with the first engagement portion 35, by the second engagement portions 74, 78, the attaching protrusion 24 can be clamped by the first engagement portion 35 and the second engagement portions 74, 78 from opposite sides in the direction of the axis L1.

(10) Since two tongue piece (the first tongue piece 71 and the second tongue piece 75) are provided, the amount of elastic deformation of each of the tongue pieces 71, 75 is smaller than that in a case in which a single tongue piece is provided (FIG. 17B).

Therefore, the tongue pieces 71, 75 can be formed of a material having a small elastic limit, which reduces the costs of the retainer 30.

To greatly elastically deform a single tongue piece that is formed of a material having a small elastic limit, the tongue piece must be elongated. This will increase the size and weight of the retainer 30.

In this regard, the second embodiment provides two tongue pieces (the first tongue piece 71 and the second tongue piece 75) to prevent the retainer 30 from being increased in size and weight, while ensuring a certain amount of elastic deformation.

Third Embodiment

A gas generator and an airbag apparatus according to a third embodiment will now be described with reference to FIGS. 18 to 20B.

The third embodiment is different from the second embodiment in the structure of the first engagement portion 35 and the second engagement portions 74, 78 in the retainer 30.

In place of the second inclined portions 74B, 78B of the second embodiment, the second engagement portions 74, 78 of the third embodiment have parallel portions 74C, 78C. When the attaching protrusion 24 is clamped by the first engagement portion 35 and the second engagement portions 74, 78, that is, when none of the first and second tongue pieces 71, 75 (none of the elastic portions 72, 76) is elastically deformed, the parallel portions 74C, 78C are parallel with the axis L1. Since the parallel portions 74C, 78C are formed on the second engagement portions 74, 78, the second engagement portions 74, 78 have corners 74D, 78D at positions that are close to the engagement base 34 and face each other. When the attaching protrusion 24 is clamped by the first engagement portion 35 and the second engagement portions 74, 78, the corners 74D, 78D of the second engagement portions 74, 78 push the attaching protrusion 24 toward the first engagement portion 35. In the third embodiment, the first engagement portion 35 is deeper than the first engagement portion 35 of the second embodiment.

Other than these differences, the third embodiment is the same as the second embodiment. Therefore, like or the same reference numerals are given to those components that are like or the same as the corresponding components of the second embodiment and detailed explanations are omitted.

When the retainer 30 having the above described configuration is used, the attachment process is slightly different from that in the second embodiment when the airbag apparatus 60 is assembled. The differences of the attachment process from that in the second embodiment will be mainly discussed.

<Attachment Process>

In the attachment process, part of the inflator 20 is inserted into the holding portion 31 of the retainer 30 via the insertion port 54. As indicated by solid lines of FIG. 20A, the attaching protrusion 24 is restricted from entering the engagement space 41 through the inlet 42. This is because the width W1 of the inlet 42 is narrower than the size (the outer diameter D1) of the attaching protrusion 24 as shown in FIG. 19.

Next, a force is applied to the inflator 20 to move the inflator 20 in the direction of the axis L1 against the restriction and toward the engagement base 34 (rightward as viewed in FIG. 20A), such that the attaching protrusion 24 increases the width W1 of the inlet 42.

As shown in FIG. 20B, the above described force is transmitted to the second engagement portions 74, 78 (protrusions) via the attaching protrusion 24 and the first inclined portions 74A, 78A. The tongue pieces 71, 75 are elastically deformed in the circumferential direction of the holding portion 31 to increase the width W1 of the inlet 42 about fulcrums, which are the basal ends, that is, the ends at which the second engagement portions 74, 78 are not formed (the boundaries 72A, 76A with the holding portion 31 of the elastic portions 72, 76).

When the width W1 is increased to be greater than the size (the outer diameter D1) of the attaching protrusion 24, that is, when the attaching protrusion 24 has gone past the first inclined portions 74A, 78A, the attaching protrusion 24 moves to the parallel portions 74C, 78C. The attaching protrusion 24 is guided to the first engagement portion 35 while moving in the direction of the axis L1 and sliding on the parallel portions 74C, 78C.

When the attaching protrusion 24 has gone past the parallel portions 74C, 78C, the attaching protrusion 24 can enter the engagement space 41. When the attaching protrusion 24 has entered the engagement space 41 as indicated by broken lines in which a long dash alternates with a pair of short dashes in FIG. 20B, part of (substantially the half) the attaching protrusion 24 is engaged with the first engagement portion 35 with nor or little clearance. In the third embodiment, since the first engagement portion 35 is deeper than the first engagement portion 35 of the second embodiment, the attaching protrusion 24 is engaged with the first engagement portion 35 by a larger area than the in the second embodiment.

Also, when the attaching protrusion 24 enters the engagement space 41 as described above, the tongue pieces 71, 75, which have been elastically deformed, act to restore the original shapes to reduce the width W1 of the inlet 42 in the circumferential direction of the holding portion 31 by the own elastic shape restoring force. Due to the elastic shape restoration, the corners 74D, 78D of the second engagement portions 74, 78 contact the protrusion 24. Through the contact, the second engagement portions 74, 78 push the attaching protrusion 24 toward the first engagement portion 35. As indicated by broken lines in which a long dash alternates with a pair of short dashes in FIG. 19, the attaching protrusion 24 becomes clamped by the first engagement portion 35 and the second engagement portions 74, 78 from opposite sides in the direction of the axis L1.

In this manner, the attaching protrusion 24 is engaged with the first engagement portion 35 and the second engagement portions 74, 78, so that the inflator 20 is attached to the transitional assembly 61 with its position determined. The intended airbag apparatus 60 is thus obtained.

Therefore, according to the third embodiment, although the second engagement portions 74, 78 push parts of the attaching protrusion 24 that are different from those in the previous embodiments when the attaching protrusion 24 is clamped by the first engagement portion 35 and the second engagement portions 74, 78, the same advantages as items (1) to (3), (4A), (5A), (6), and (8) to (10) are achieved.

Fourth Embodiment

A gas generator and an airbag apparatus according to a fourth embodiment will now be described with reference to FIGS. 21 to 23B.

The fourth embodiment is different from the first embodiment in the structure of the engagement base 34 and a tongue piece in the retainer 30. The differences between the fourth embodiment and the first embodiment will be mainly discussed.

An inflator 20 is configured to be movable (in a straightly line) in the direction of the axis L1 with part of the inflator 20 covered with a holding portion 31.

Figure 21:
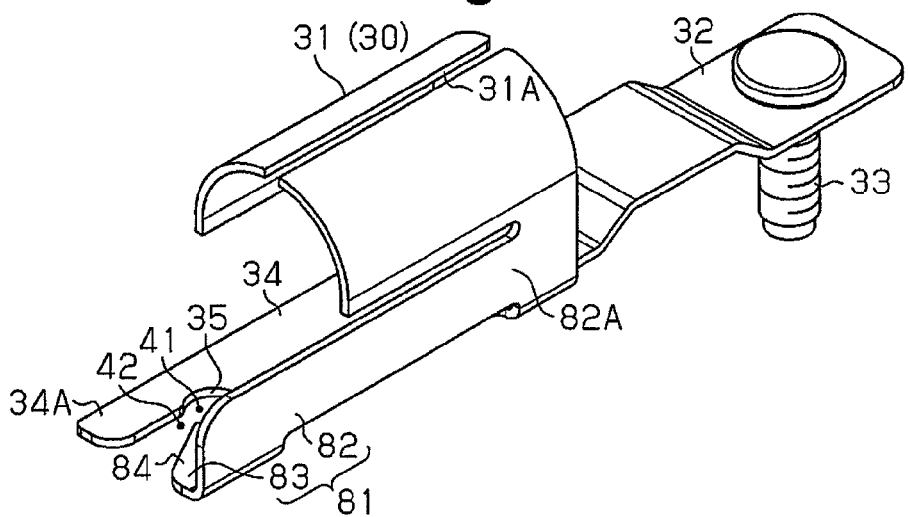
FIG. 21 is a perspective view illustrating a retainer to be installed in a gas generator according to a fourth embodiment.
Figure 22:
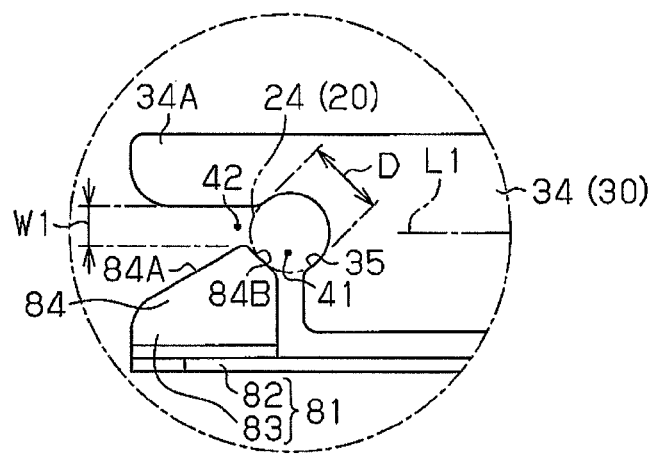
FIG. 22 is a partial plan view showing part of the retainer of the fourth embodiment.

As shown in FIGS. 21 and 22, the holding portion 31 has an engagement base 34 and a single tongue piece 81, which extend in the direction of the axis L1 and away from the attaching protrusion 33. The tongue piece 81 is located at a position separated from the engagement base 34 in the circumferential direction of the holding portion 31.

The engagement base 34 is formed substantially as a flat plate. The engagement base 34 extends in the direction of the axis L1 away from the attaching protrusion 33 and is longer than the holding portion 31.

When pressed by the attaching protrusion 24, which moves in the direction of the axis L1 together with the inflator 20, the tongue piece 81 is elastically deformed away from the engagement base 34 in the circumferential direction of the holding portion 31. To be elastically deformed, the first tongue piece 81 has an elastic portion 82, which extends from a position separated from the engagement base 34 in the circumferential direction of the holding portion 31. The elastic portion 82 is formed substantially as a flat plate and substantially perpendicular to the engagement base 34. Therefore, a direction perpendicular to the plane of the elastic portion 82 (thickness direction) substantially matches with the direction along the plane of the engagement base 34. Thus, when a force along the plane of the engagement base 34 is applied, the engagement base 34 is elastically deformed in that direction by a small amount, whereas the tongue piece 81 is more easily elastically deformed than the engagement base 34 about a fulcrum, which is a boundary 82A between the elastic portion 82 and the holding portion 31.

The elastic portion 82 is formed to extend in the direction of the axis L1 away from the attaching protrusion 33 by the similar length as the engagement base 34. The tongue piece 81 includes an acting portion 83 formed by bending at the distal end, that is, at an end away from the attaching protrusion 33 (left side as viewed in FIG. 21). The acting portion 38 is located at an edge of the elastic portion 82 that is close to the engagement base 34 (lower side as viewed in FIG. 21). The acting portion 83 is formed substantially as a flat plate and is located in the same plane as the engagement base 34. The acting portion 83 is separated from the first engagement portion 35 in the direction of the axis L1 and in the circumferential direction of the holding portion 31.

The engagement base 34 includes a first engagement portion 35 at a distal end, or an end that is away from the attaching protrusion 33 (the left end as viewed in FIG. 22) of the ends in the direction of the axis L1. The tongue piece 81 includes a second engagement portion 83 in the acting portion 83.

When the inflator 20 is assembled to the retainer 30, the attaching protrusion 24 is engaged with the first engagement portion 35 and the second engagement portion 84. The first engagement portion 35 and the second engagement portion 84 face each other in a direction intersecting the axis L1, and clamp the attaching protrusion 24 from opposite sides in that direction. The space between the first engagement portion 35 and the second engagement portion 84 is an engagement space 41, which is substantially circular in a plan view. When the inflator 20 is moved in the direction of the axis L1 with part of the inflator 20 covered with the holding portion 31, the attaching protrusion 24 enters and is engaged with the engagement space 41.

Further, the engagement base 34 includes an extension 34A, which extends from the first engagement portion 35 in the direction of the axis L1 and away from the attaching protrusion 33.

To allow the attaching protrusion 24 to enter the engagement space 41 when the inflator 20 moves, the engagement space 41 has an inlet 42 of the engagement space 41 at a position separated from the attaching protrusion 33 in the direction of the axis L1, or in a space between the second engagement portion 84 and the extension 34A in the present embodiment.

As illustrated in FIG. 22, the first engagement portion 35 is a recess that is recessed away from the second engagement portion 84 in a direction intersecting the axis L1, that is, recessed obliquely rightward and upward as viewed in FIG. 22. The recess is arcuate and has substantially the same curvature as the attaching protrusion 24, which has a circular cross-sectional shape. The second engagement portion 84 is formed by a projection that protrudes in the circumferential direction of the holding portion 31 and toward the extension 34A of the engagement base 34.

When the attaching protrusion 24 is not clamped by the first engagement portion 35 and the second engagement portion 84, that is, when the tongue piece 81 (the elastic portion 82) is not elastically deformed, the width W1 of the inlet 42 of the engagement space 41 is less than the size (outer diameter D1) of the attaching protrusion 24.

The edge of the extension 34A that is closer to the tongue piece 81 is parallel with the axis L1. The second engagement portion 84 has a first inclined portion 84A at the edge that is separated from the attaching protrusion 33 in the direction of the axis L1. The first inclined portion 84A is inclined to approach the extension 34A toward the attaching protrusion 33. Therefore, the clearance between the extension 34A and the first inclined portion 84A decreases toward the attaching protrusion 33.

The second engagement portion 84 has a second inclined portion 84B at the edge that is closer to the attaching protrusion 33 in the direction of the axis L1. The second inclined portion 84B is inclined to separate away from the extension 34A toward the attaching protrusion 33.

Other than these differences, the fourth embodiment is the same as the first embodiment. Therefore, like or the same reference numerals are given to those components that are like or the same as the corresponding components of the first embodiment and detailed explanations are omitted.

When the retainer 30 having the above described configuration is used, the insertion process and the attachment process are different from those in the first embodiment when the airbag apparatus 60 is assembled. The differences of the insertion process and the attachment process from those in the first embodiment will be mainly discussed.

<Insertion Process>

In the insertion process, outside the airbag 50, part of the inflator 20 is inserted into the interior (the accommodation portion 51) of the airbag 50 in the transitional assembly 61 from the first end (the gas outlet 21) through the insertion port 54. Unlike the first embodiment, the inflator 20 is inserted in an orientation with the attaching protrusion 24 protruding in a direction parallel with the attaching protrusion 33 in the fourth embodiment. The inflator 20 is moved in a straight line toward the attaching protrusion 33 in the direction of the axis L1 with the orientation maintained.

<Attachment Process>

In the attachment process, part of the inflator 20 is inserted into the holding portion 31 of the retainer 30 via the insertion port 54. During the insertion, the attaching protrusion 24 approaches the second engagement portion 84 and the extension 34A.

Figure 23A:
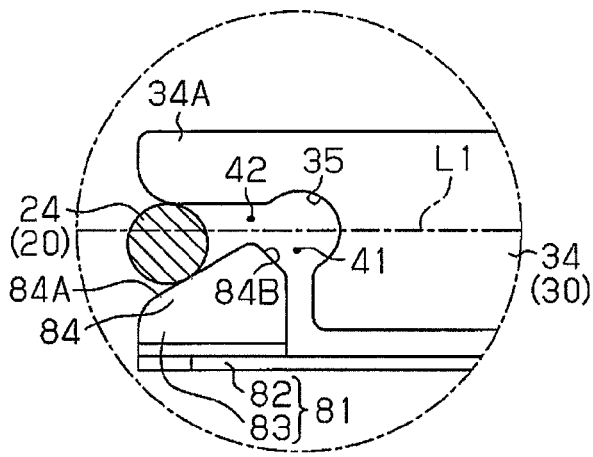
FIGS. 23A and 23B are partial plan views corresponding to FIG. 22, illustrating a process in which an attaching protrusion of the inflator is engaged with an engagement portion of the retainer in the fourth embodiment.

As indicated by solid lines of FIG. 23A, the attaching protrusion 24 is restricted from entering the engagement space 41 through the inlet 42. This is because the width W1 of the inlet 42 is narrower than the size (the outer diameter D1) of the attaching protrusion 24 as shown in FIG. 22.

Next, a force is applied to the inflator 23 to move the inflator 20 in the direction of the axis L1 against the restriction and toward the attaching protrusion 33 (rightward as viewed in FIG. 23A), such that the attaching protrusion 24 increases the width W1 of the inlet 42. At this time, the holding portion 31 functions to guide the movement of the inflator 20 in the direction of the axis L1.

Figure 23B:
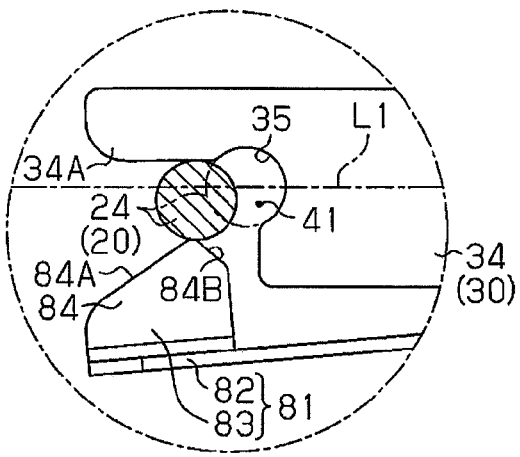

As shown in FIG. 23B, the above described force, which acts to move the inflator 20, is transmitted to the second engagement portion 84 via the attaching protrusion 24 and the first inclined portion 84A. The direction in which the attaching protrusion 24 widens the clearance between the extension 34A and the second engagement portion 84 is substantially the same as the thickness direction of the elastic portion 82 of the tongue piece 81. Accordingly, the tongue piece 81 is easily elastically deformed in the circumferential direction of the holding portion 31 to increase the width W1 of the inlet 42 about a fulcrum, which is the basal end, that is, the end at which the second engagement portion 84 is not formed (the boundary 82A with the holding portion 31 of the elastic portion 82).

With the elastic deformation, the first inclined portion 84A and the second inclined portion 84B of the second engagement portion 84 are moved away from the extension 34A of the engagement base 34 in the circumferential direction of the holding portion 31, so that the width W1 of the inlet 42 is increased. The first inclined portion 84A is inclined to approach the extension 34A toward the attaching protrusion 33. Therefore, the attaching protrusion 24 is guided to the first engagement portion 35 while moving in the direction of the axis L1 and sliding on the first inclined portion 84A. When the width W1 of the inlet 42 is increased to be wider than the size (the outer diameter D1) of the attaching protrusion 24, that is, when the attaching protrusion 24 has gone past the first inclined portion 84A, the attaching protrusion 24 can enter the engagement space 41. When the attaching protrusion 24 has entered the engagement space 41 as indicated by broken lines in which a long dash alternates with a pair of short dashes in FIG. 22, part of the attaching protrusion 24 is engaged with the first engagement portion 35 with nor or little clearance.

The direction of movement of the inflator 20 is the same as the direction along the plane of the engagement base 34. Thus, if the attaching protrusion 24 pushes the engagement base 34, the amount of elastic deformation in the direction of the engagement base 34 is small.

Also, when the attaching protrusion 24 enters the engagement space 41 as described above, the tongue piece 81, which has been elastically deformed, acts to restore the original shape to reduce the width W1 of the inlet 42 in the circumferential direction of the holding portion 31 by the elastic shape restoring force of the elastic portion 82 of the tongue piece 81. Due to the elastic shape restoration, the second inclined portion 84B of the second engagement portion 84 contacts the protrusion 24. Through the contact, the second engagement portion 84 pushes the attaching protrusion 24 toward the first engagement portion 35. The attaching protrusion 24 becomes clamped by the first engagement portion 35 and the second engagement portion 84 from opposite sides in the direction intersecting the axis L1. In this state, the direction of the elastic shape restoration of the tongue piece 81 is substantially the same as the thickness direction of the elastic portion 82. Therefore, the amount of the elastic shape restoration of the tongue piece 81 is great so that there is no or little clearance between i) the attaching protrusion 24 and ii) the first engagement portion 35 and the second engagement portion 84. The position of the attaching protrusion 24 in the direction of the axis L1 is determined, so that the rattling of the inflator 20 in that direction is reduced.

When the attaching protrusion 24 is engaged with the first engagement portion 35 as described above, the position of the attaching protrusion 24 is determined in the circumferential direction, so that rattling of the inflator 20 in that direction is reduced.

In this manner, the attaching protrusion 24 is engaged with the first engagement portion 35 and the second engagement portion 84, so that the inflator 20 is attached to the transitional assembly 61 with its position determined. The intended airbag apparatus 60 is thus obtained.

As described above, the inflator 20 is installed simply by inserting the inflator 20 into the holding portion 31 and moving the inflator 20 in the direction of the axis L1. The load required to move the inflator 20 changes before and after the attaching protrusion 24 is engaged with the first engagement portion 35. That is, prior to the engagement of the attaching protrusion 24 with the first engagement portion 35, in other words, during sliding motion of the protrusion 24 on the first inclined portion 84A, the operating load increases as the inflator 20 moves further. When the attaching protrusion 24 is engaged with the first engagement portion 35, the operating load abruptly decreases. This provides a clicking sensation, which improves the operational sensation.

The airbag apparatus 60 that is obtained in the above described procedure is fixed to the vehicle component 11 (the frame) as in the first embodiment.

Accordingly, in addition to the advantages of items (1) to (3), (6), (8), and (9), the fourth embodiment achieves advantages of items (4B) and (5B) in place of the advantages of items (4) and (5).

(4B) The tongue piece 81 is located at a position separated from the engagement base 34 in the circumferential direction of the holding portion 31. The first engagement portion 35 is formed at the distal end of the engagement base 34, and the second engagement portion 84 is formed at the distal end of the tongue piece 81. The first engagement portion 35 and the second engagement portion 84 face each other in the direction intersecting the axis L1. Further, the engagement base 34 includes an extension 34A, which extends from the first engagement portion 35 in the direction of the axis L1 and away from the attaching protrusion 33. The inflator 20 is movable toward the holding portion 31 in the direction of the axis L1 with part thereof covered with the holding portion 31. As the inflator 20 moves, the tongue piece 81 is pushed by the attaching protrusion 24 and to be elastically deformed and moved away from the engagement base 34 in the circumferential direction of the holding portion 31 (FIG. 21).

Therefore, by moving the inflator 20 in the direction of the axis L1 toward the protrusion 33, the tongue piece 81 can be elastically deformed in the circumferential direction of the holding portion 31 to increase the width W1 of the inlet 42 of the engagement space 41. Also, by causing the attaching protrusion 24 to enter into the engagement space 41, the tongue piece 81 can elastically restore the original shapes in the circumferential direction of the holding portion 31 to reduce the width W1.

(5B) The first engagement portion 35 is formed to be recessed away from the second engagement portion 84 in the direction intersecting the axis L1 to receive part of the attaching protrusion 24. The second engagement portion 84 is formed by a protrusion that protrudes toward the extension 34A (FIG. 22).

Therefore, by elastically pressing the attaching protrusion 24, which is engaged with the first engagement portion 35, by the second engagement portion 84, the attaching protrusion 24 can be clamped by the first engagement portion 35 and the second engagement portion 84 from opposite sides in the direction intersecting the axis L1.

The above embodiments may be modified as follows.

<Modification to Inflator 20>

A positioning protrusion may be provided separately from the attaching protrusion 24 of the inflator 20. In this case, the positioning protrusion may be shorter than the attaching protrusion 24 as long as the positioning protrusion can be clamped by the first engagement portion 35 and the second engagement portion 39, 74, 78, 84.

Part of the inflator 20 may be installed to extend over the entire retainer 30 in the airbag 50 (the accommodation portion 51). Also, the entire inflator 20 may be installed to extend over part of the retainer 30 in the airbag 50 (the accommodation portion 51).

<Modification to Attaching Protrusions 24, 33>

The attaching protrusions 24, 33 may be members other than bolts as long as the protrusions 24, 33 function to fix the inflator 20 and the retainer 30 to a vehicle.

A plurality of attaching protrusions 33 may be provided on the retainer 30 along the axis L1 of the inflator 20.

Like the attaching protrusion 33 of the retainer 30, the attaching protrusion 24 (positioning protrusion) of the inflator 20 may be passed through the vehicle component 11 after being passed through the airbag 50, and then fastened to the vehicle component 11 by the nut 12.

Of the attaching protrusions 24, 33, only the attaching protrusion 24 of the inflator 20 may be passed through the vehicle component 11 after being passed through the airbag 50, and then fastened to the vehicle component 11 by the nut 12. In this case, the attaching protrusion 33 of the retainer 30 is passed through only the vehicle component 11 and fastened to the vehicle component 11 by the nut 12.

At least one of the attaching protrusions 24, 33 may intersect the axis L1 at an angle other than a right angle.

As long as the attaching protrusions 24, 33 intersect the axis L1, the protrusions 24, 33 may protrude in different directions.

The attaching protrusions 24, 33 may be fixed to different components in a vehicle.

<Modification to Holding Portion 31>

As long as the holding portion 31 covers part of the inflator 20 in the direction of the axis L1, the holding portion 31 may have a shape different from those described in the above embodiments. For example, the holding portion 31 may be non-tubular. Specifically, the holding portion 31 may have a cut 31A having a wider width than that in the above described embodiments.

The holding portion 31 may be located at a position off the substantial center of the retainer 30 in the direction of the axis L1.

A plurality of holding portions 31 may be provided along the axis L1.

In the first embodiment, a curved portion of the holding portion 31, which has a substantially cylindrical shape, is used as part of the elastic portion 37 (including the boundary 37A). In this case, the curved portion functions to reduce elastic deformation of the elastic portion 37. This configuration is effective to prevent the tongue piece 36 from being largely elastically deformed when the inflator 20 is rotated to cause the attaching protrusion 24 to increase the width W1 of the inlet 42.

Figure 25:
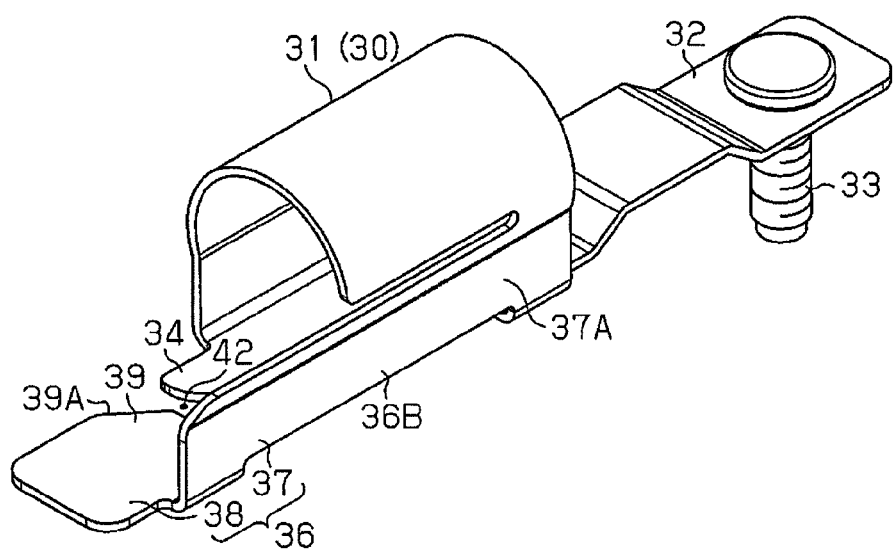
FIG. 25 is a perspective view corresponding to FIG. 1, illustrating a modification to the retainer of the first embodiment.
Figure 26:
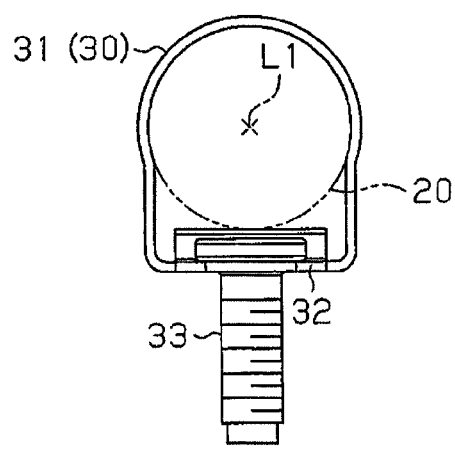
FIG. 26 is a rear view corresponding to FIG. 6, illustrating a modification to the retainer of the first embodiment.

When the tongue piece 36 is desired to be largely elastically deformed, a flat plate portion 36B may be formed at a position in the holding portion 31 that is close to the engagement base 34 as shown in FIGS. 25 and 26 (lower part as viewed in FIGS. 25 and 26). The flat plate portion 36B may be used as part of the elastic portion 37 (including the boundary 37A). In this configuration, since the elastic portion 37, which includes the flat plate portion 36B, is more easily elastically deformed than the curved elastic portion 37 of the first embodiment, the above described demand is satisfied.

As shown in FIGS. 25 and 26, a holding portion 31 having no cut 31A may be employed. For example, a holding portion 31 having no cut 31A can be obtained by welding the part of the cut 31A in a holding portion 31.

In this case, the strength of the holding portion 31 for holding the inflator 20 when the airbag 50 is inflated is increased compared to the case with a cut 31A.

A holding portion 31 having a cut 31A is more easily elastically deformed than a holding portion having no cut 31A. Therefore, the inflator 20 is easily inserted into the holding portion 31.

Therefore, regarding whether to form a cut 31A in the holding portion 31 or not, a cut 31A may be formed to increase the holding strength of the holding portion 31, and also no cut 31A may be formed in the inflator 20 to facilitate the insertion of the inflator 20.

Although not illustrated, the retainers 30 of the first to fourth embodiments may have a cut 31A or may have no cut 31A.

<Modification to Engagement Base 34>

The engagement base 34 may extend in the direction of the axis L1 of the inflator 20 from part of the retainer 30 that is not the retainer 30.

The engagement base 34 need not necessarily extend in the direction of the axis L1. For example, part (an end) of the holding portion 31 may be formed to function as the engagement base 34.

<Modification to Tongue Piece 36>

The tongue piece 36 may extend in the direction of the axis L1 of the inflator 20 from part of the retainer 30 that is not the retainer 30. In this case also, the tongue piece 36 is configured to be elastically deformed about a fulcrum, which is its basal end, or the end at which the second engagement portion 39 is not provided.

<Modification to Engagement Portions>

Figure 24:
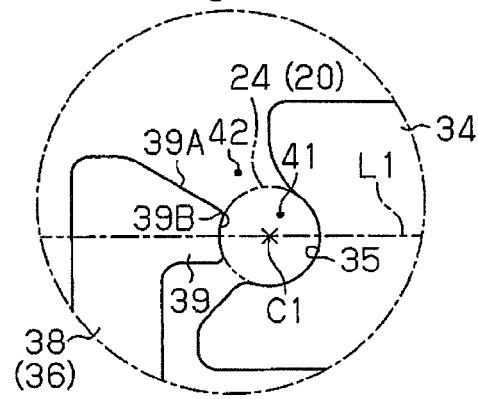
FIG. 24 is a partial plan view corresponding to FIG. 3, illustrating a modification to the second engagement portion of the first embodiment.

As shown in FIG. 24, part 39B of the second engagement portion 39 of the first embodiment that elastically contacts the attaching protrusion 24 may be arcuately recessed to conform to the cross-sectional shape of the attaching protrusion 24. In this case, the attaching protrusion 24 is engaged with the first engagement portion 35 and the second engagement portion 39 in a wider area. Accordingly, the attaching protrusion 24 is further effectively prevented from moving in the circumferential direction of the holding portion 31.

Contrary to the first embodiment, the second engagement portion 39 may be formed by a recess and the first engagement portion 35 may be formed by a protrusion.

In the above embodiments, the second engagement portion 39, 74, 78, 84 may be formed at a position in the tongue piece 36, 71, 75, 81 that is away from the basal end and different from the distal end (middle portion in the direction of the axis L1).

<Modification to Engagement Space 41>

The inlet 42 of the engagement space 41 may have a narrow width over a certain length.

<Modification to Transitional Assembly 61>

An airbag apparatus 60 in a state in which the retainer 30 is arranged in and secured to the airbag 50 may be defined as a transitional assembly 61 such that the first engagement portion 35 and the second engagement portion 39, 74, 78, 84 are located in the accommodation portion 51.

An airbag apparatus 60 in a state in which the retainer 30 is arranged in and secured to the airbag 50 may be defined as a transitional assembly 61 such that the whole holding portion 31 is exposed from the accommodation portion 51. Alternatively, an airbag apparatus 60 in a state in which the retainer 30 is arranged in and secured to the airbag 50 may be defined as a transitional assembly 61 such that the whole holding portion 31 is located in the accommodation portion 51.

<Other Modifications>

In the above described embodiments, the inflator 20 is inserted into the accommodation portion 51 of the airbag 50, in which part of the retainer 30 is received, through the insertion port 54, and part of the inflator 20 is assembled to the part of the retainer 30 in the accommodation portion 51. Instead of this, the inflator 20 and the retainer 30 may be assembled together outside the airbag 50 before the inflator 20 and the retainer 30 are inserted into the accommodation portion 51. In this case also, the assembly of the retainer 30 to the inflator 20 is facilitated, and rattling of the assembled inflator 20 is reduced.

The above described airbag apparatus can be applied to various types of airbag apparatuses such as a side airbag apparatus.

The above described gas generator may be device that is designed for supplying gas to a device other than an airbag apparatus.

The term "vehicle" herein refers to not only passenger vehicles and various types of industrial vehicles but also any type of passenger transport means. For examples, vehicles include aircrafts and vessels. When the airbag apparatus is applied to such vehicles, the attaching protrusion of the retainer is attached to the vehicle so that a gas generator is fixed to the vehicle.

Therefore, the present examples and embodiments are to be considered as illustrative and not restrictive and the invention is not to be limited to the details given herein, but may be modified within the scope and equivalence of the appended claims.

The invention claimed is:

1. A gas generator comprising an elongated inflator, which discharges gas for inflation and a retainer having a holding portion, the holding portion covering part of the inflator with respect to a direction of an axis of the inflator, wherein
a positioning protrusion for determining the position of the inflator relative to the retainer is formed on an outer surface of the inflator,
the retainer includes an engagement base and a tongue piece, which extends in the direction of the axis of the inflator and from a position separated from the engagement base in the circumferential direction of the holding portion,
the engagement base has an engagement portion,
the tongue piece has an engagement portion located at a position separated from a basal end of the tongue piece,
the engagement portion of the engagement base and the engagement portion of the tongue piece face each other such that an engagement space is formed between the engagement portions, into which space the positioning protrusion enters,
the engagement space has an inlet the width of which is less than a size of the positioning protrusion, and
in a state in which part of the inflator is covered with the holding portion, when the inflator is rotated or moved to cause the positioning protrusion of the inflator to increase the width of the inlet, the tongue piece is elastically deformed about a fulcrum, which is the basal end of the tongue piece, to increase the width of the inlet.

2. The gas generator according to claim 1, wherein
the retainer and the inflator each have on an outer surface an attaching protrusion for attaching the retainer and the inflator to a vehicle, and
the positioning protrusion is formed by the attaching protrusion of the inflator.

3. The gas generator according to claim 2, wherein the tongue piece includes an elastic portion, and wherein, when the inflator is rotated or moved and the tongue piece is pushed by the positioning protrusion, the elastic portion is elastically deformed in a direction of the thickness of the elastic portion.

4. The gas generator according to claim 2, wherein
the engagement portion of the engagement base forms a first engagement portion,
the engagement portion of the tongue piece forms a second engagement portion,
the first engagement portion and the second engagement portion face each other in the direction of the axis of the inflator,
the inflator is rotational about the axis of the inflator with part of which covered with the holding portion, and
when the inflator is rotated, the tongue piece is pushed by the positioning protrusion to be elastically deformed away from the engagement base in the circumferential direction of the holding portion.

5. The gas generator according to claim 4, wherein
the first engagement portion is formed by a recess that is recessed away from the second engagement portion in the direction of the axis of the inflator, with which recess part of the positioning protrusion is engaged, and
the second engagement portion is formed by a protrusion protruding toward the first engagement portion.

6. The gas generator according to claim 5, wherein the second engagement portion has an edge that is located in the vicinity of the inlet, the edge being inclined with respect to the axis of the inflator to extend toward a center of the first engagement portion.

7. The gas generator according to claim 2, wherein
the tongue piece forms a first tongue piece,
the gas generator further includes a second tongue piece, which extends in the direction of the axis of the inflator,
the second tongue piece has an engagement portion at a position that is away from a basal end of the second tongue,
the first and second tongue pieces are located on opposite sides of the engagement base in the circumferential direction of the holding portion,
the engagement portion of the engagement base forms a first engagement portion,
the engagement portion of each tongue piece forms a second engagement portion,
the second engaging portions of the first and second tongue pieces face each other in the circumferential direction of the holding portion,
the first engagement portion and the second engagement portions face each other in the direction of the axis of the inflator,
the inflator is movable in the direction of the axis of the inflator with part of which covered with the holding portion, and
when the inflator is moved in the direction of the axis of the inflator and the positioning protrusion of the inflator pushes each tongue piece, each tongue piece is elastically deformed away from the engagement base in the circumferential direction of the holding portion.

8. The gas generator according to claim 7, wherein
the first engagement portion is formed by a recess that is recessed away from the second engagement portions in the direction of the axis of the inflator, with which recess part of the positioning protrusion is engaged, and
the second engagement portions of the first and second tongue pieces are formed by protrusions protruding to face each other.

9. The gas generator according to claim 2, wherein
the engagement portion of the engagement base forms a first engagement portion,
the engagement portion of the tongue piece forms a second engagement portion,
the first engagement portion and the second engagement portion face each other in a direction intersecting the axis of the inflator,
the engagement base has an extension, which extends from the first engagement portion in the direction of the axis of the inflator,
the inflator is movable in the direction of the axis of the inflator with part of which covered with the holding portion, and
when the inflator is moved in the direction of the axis of the inflator and the positioning protrusion pushes the tongue piece, the tongue piece is elastically deformed away from the engagement base in the circumferential direction of the holding portion.

10. The gas generator according to claim 9, wherein
the first engagement portion is formed by a recess that is recessed away from the second engagement portion in the direction intersecting the axis of the inflator, with which recess part of the positioning protrusion is engaged, and
the second engagement portion is formed by a protrusion protruding toward the extension.

11. The gas generator according to claim 1, wherein
the positioning protrusion has a circular cross-sectional shape, and
the engagement portion of the engagement base is arcuate and has substantially the same curvature as the positioning protrusion.

12. An airbag apparatus comprising:
the gas generator according to claim 2; and
an airbag, wherein
the gas generator is located inside the airbag and generates gas to inflate the airbag with the generated gas, and
at least one of the attaching protrusion of the retainer and the attaching protrusion of the inflator is passed through the airbag and both attaching protrusions are fastened to a vehicle component, so that the gas generator and the airbag are fixed to the vehicle.

13. The airbag apparatus according to claim 12, wherein, in the airbag, at least part of the inflator in the gas generator is assembled to at least part of the retainer.

14. The airbag apparatus according to claim 13, wherein the gas generator is arranged in a transitional form for distribution, in which only the retainer is secured to the airbag.

* * * * *